United States Patent [19]

Agarwal

[11] Patent Number: 5,822,749
[45] Date of Patent: Oct. 13, 1998

[54] DATABASE SYSTEM WITH METHODS FOR IMPROVING QUERY PERFORMANCE WITH CACHE OPTIMIZATION STRATEGIES

[75] Inventor: Brijesh Agarwal, Albany, Calif.

[73] Assignee: Sybase, Inc., Emeryville, Calif.

[21] Appl. No.: 808,604

[22] Filed: Feb. 28, 1997

Related U.S. Application Data

[60] Provisional application No. 60/031,177 Nov. 19, 1996.

Related U.S. Application Data

[63] Continuation-in-part of Ser. No. 554,126, Nov. 6, 1995, which is a continuation-in-part of Ser. No. 273,867, Jul. 12, 1994, Pat. No. 5,680,573.

[51] Int. Cl.[6] ..................................................... G06F 17/30
[52] U.S. Cl. .................................. 707/2; 707/3; 707/200
[58] Field of Search .................................... 707/2, 3, 200

[56] References Cited

U.S. PATENT DOCUMENTS

| 4,989,132 | 1/1991 | Mellender et al. | 395/705 |
|---|---|---|---|
| 5,452,445 | 9/1995 | Hallmark et al. | 707/2 |
| 5,555,388 | 9/1996 | Shaughnessy | 711/100 |
| 5,666,525 | 9/1997 | Ross | 707/2 |
| 5,671,403 | 9/1997 | Shekita et al. | 707/3 |

OTHER PUBLICATIONS

"Frequently Used Data Flush Avoidance in Cache Backing Store," IBM Technical Disclosure Bulletin, vol. 21, No. 10, Mar. 1979, p. 4199.

Hennessey, J. and Patterson, D., "Computer Architecture A Quantitative Approach," Morgan Kaufman Publishers, Inc., 1990, pp. 411–412.

Schneider, G. and Bruell, S., "Concepts In Data Structures & Software Development," West Publishing Company, 1991, pp. 198, 318–329.

Primary Examiner—Thomas G. Black
Assistant Examiner—Cheryl Lewis
Attorney, Agent, or Firm—John A. Smart

[57] ABSTRACT

Database system and methods are described for improving execution speed of database queries (e.g., for transaction processing and for decision support) by optimizing use of buffer caches. The system includes an Optimizer for formulating an optimal strategy for a given query. More particularly, the Optimizer communicates with a Buffer Manager before it formulates the query plan. For instance, the Optimizer may query the Buffer Manager for the purpose of determining whether the object of interest (e.g., table or index to be scanned) exists in its own buffer cache (i.e., whether it has been bound to a particular named cache). If the object exists in its own cache, the Optimizer may inquire as to how much of the cache (i.e., how much memory) the object requires, together with the optimal I/O size for the cache (e.g., 16K blocks). Based on this information, the Optimizer formulates a query strategy or plan with "hints," which are ultimately passed to the Cache or Buffer Manager. By formulating "hints" for the Buffer Manager at the level of the Optimizer, knowledge of the query is, in effect, passed down to the Buffer Manager so that it may service the query using an optimal caching strategy—one based on the dynamics of the query itself. Based on the "hints" received from the Optimizer, the Buffer Manager can fine tune input/output (i.e., cache management) for the query. Specific Optimizer strategies are described for each scan method available to the system, including heap scan, clustered index, and non-clustered index access. Additional strategies are described for multi-table access during processing of join queries.

25 Claims, 12 Drawing Sheets

STATISTICAL COST MODEL
600

THE FORMULA USED HEREIN IS BASED ON THE FOLLOWING MODEL:

$l$     LOGICAL PAGE READS PER SCAN $s$     NUMBER OF SCANS $c$     AVAILABLE CACHESIZE IN NUMBER OF PAGES $n$     NUMBER OF PAGES IN TABLE

NUMBER OF PAGE MISSES $= l + (l \times s - 1) \times (l - c/n) + (c - 1) \times (c - 1)/n$

DATABASE SYSTEM WITH METHODS FOR IMPROVING QUERY PERFORMANCE WITH CACHE OPTIMIZATION STRATEGIES

The present application claims the benefit of priority and is a continuation-in-part of commonly-owned application Ser. No. 08/554,126, filed Nov. 6, 1995, allowed, which is in turn a continuation-in-part of commonly-owned application Ser. No. 08/273,867, filed Jul. 12, 1994, U.S. Pat. No. 5,680,573 the disclosures of the applications are hereby incorporated by reference. Further, the present application claims the benefit of priority of commonly-owned provisional application Ser. No. 60/031,177, filed Nov. 19, 1996, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to processing of queries against information stored in a SQL-based data processing system, such as an SQL Relational Database Management System (RDBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee. Here, each record contains fields designating specifics about the employee, such as name, home address, salary, and the like.

Between the actual physical database itself (i.e., the records contained in data pages stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase SQL Server™ database servers. Both Powersoft™ and Sybase SQL Server™ are available from Sybase, Inc. of Emeryville, Calif. As the migration to client/server continues, each day more and more businesses are run from mission-critical systems which store information on server-based SQL database systems, such as Sybase SQL Server™. As a result, increasingly higher demands are being placed on server-based SQL database systems to provide enterprise-wide decision support—providing timely on-line access to critical business information (e.g., through "queries"). Accordingly, there is much interest in improving the performance of such systems, particularly in the area of database query performance.

SUMMARY OF THE INVENTION

The present invention comprises a Client/Server Database System with improved methods for performing database queries. In an exemplary embodiment, the system includes one or more Clients (e.g., Terminals or PCs) connected via a Network to a Server. The Server, operating under a server operating system (e.g., UNIX) includes a Database Server System, such as Sybase SQL Server™. In general operation, Clients store data in and retrieve data from one or more database tables resident on the Server by submitting SQL commands, some of which specify "queries"— criteria for selecting particular records of a table.

In general, a query against an object, such as at table, proceeds as follows. A query submitted by a client is parsed by the Parser and then passed to the Optimizer. Upon receiving the query, the Optimizer communicates with the Buffer Manager. Based on the information received from the Buffer Manager, the Optimizer formulates a strategy which is communicated to the Compiler and Execution Unit as the "query plan." At query execution time, Access Methods are invoked for performing low-level access, as required by the query plan. Below the level of the Access Methods is the Buffer Manager and the I/O (input/output) modules.

According to the present invention, therefore, the Optimizer communicates with the Buffer Manager for formulating a query plan. For instance, the Optimizer may query the Buffer Manager for the purpose of determining whether the object of interest (e.g., table or index to be scanned) exists in its own buffer cache, such as whether it has been bound to a particular "named cache." If the object exists in its own cache, the Optimizer may inquire as to how much of the cache (i.e., how much memory) the object requires, together with the optimal I/O size for the cache (e.g., 16K blocks).

Based on this information, the Optimizer formulates a query strategy or plan with "hints." Specifically, the Optimizer creates during formulation of the query plan "hints" which are passed on to the Cache or Buffer Manager. By formulating "hints" for the Buffer Manager at the level of the Optimizer, knowledge of the query is, in effect, passed down to the Buffer Manager so that it may service the query using an optimal caching strategy—one based on the dynamics of the query itself. Based on the "hints" received from the Optimizer, the Buffer Manager can fine tune input/output for the query.

The Optimizer communicates the query plan to the Compiler. After compiling the plan, the Compiler passes the plan to the Execution Unit for executing the query. Execution is carried out by invoking lower-level Access Methods which, in turn, invoke the Cache or Buffer Manager. The Buffer Manager can then take this information and apply its knowledge of caches, for further optimizing cache operation. Based on this information, for example, the Buffer Manager may decide to do large I/O transfers, pre-fetching, and the like.

The Optimizer has different strategies it can communicate to the Buffer Manager, depending on the dynamics of the query and the cache. Based on information about the query and the cache, the Optimizer can communicate different strategies to the Buffer Manager. The Optimizer picks a strategy in a manner which is transparent to the user application. Therefore, the user application does not require any special calls or logic to invoke this functionality of the Optimizer. In a preferred embodiment, however, the user application has the option of overriding the strategy chosen by the Optimizer. In such an instance, the user or client application can force a particular strategy. This is helpful in those instances where the client has better knowledge than the Optimizer can derive.

During query execution, actual communication between the Buffer Manager and the Optimizer occurs through the session descriptor, sides. The session descriptor serves as a handle on a "scan," such as a scan of a table, index, or the like. The query strategy for the scan is accessible through the session descriptor. The session descriptor, in effect, serves as a general API (Application Programming Interface) used to communicate with the Buffer Manager. For example, the session descriptor may be employed to request a particular page for a particular object in the cache. When the Buffer Manager is called for a particular page, it may in turn look at the strategy, using the session descriptor.

In an exemplary embodiment, two types of hints are employed: prefetch size and replacement strategy. The "prefetch" size, the first hint, is employed for I/O operations. "Prefetch" is the amount that the system retrieves or fetches in addition to the amount requested. If, for instance, a request is made for one data page, the system might additionally fetch or "prefetch" the next page into cache, on the likelihood that it might soon be needed.

Two types of prefetch exist: "hard" prefetch and "soft" prefetch. In a soft prefetch, if the system cannot fetch or retrieve the requested size (e.g., because sufficient memory does not exist), it will fetch the size which best matches the request (given that the request itself cannot be satisfied exactly). In a hard prefetch, in contrast, the amount prefetched must satisfy that which was requested. If the amount requested is unavailable for some reason, the system will nevertheless wait until it can satisfy the hard prefetch request; alternatively, a value (e.g., NULL) can be returned, indicating that the client is to handle the inability to perform a hard prefetch. For example, if much contention exists for a particular size which has been requested for a hard prefetch, the system will wait until that size is available (or returns). A hard prefetch is typically employed in those instances where system operation is greatly improved by large buffer I/O, such as when needed for creating a database. A hard prefetch will generally not be employed within the main transaction path.

Replacement strategy, the second hint, is the strategy employed for "buffer reuse." Here, the system adopts a "most-recently used" (MRU) replacement strategy, as opposed to the conventionally-employed LRU strategy. MRU replacement is the strategy of linking a page which has been used back to the LRU (least-recently used) side of the LRU chain, instead of the MRU side which is typically employed. Thus, this hint indicates that the system suspects that it might not need this particular page again, so the page is marked for indicating that it should be preferentially "bumped" (paged out) from the cache.

This "fetch and discard" or reverse strategy is useful in situations where the system suspects that particular buffers will not be reused. In such instances, the system knows that it would be inefficient to "wipe out" cache—filling cache memory with data pages which are not likely to be re-used (anytime soon). Accordingly, buffers used for the query are linked to the end of the reuse chain such that their buffers are available for immediate reuse. The MRU's strategy is generated both by the particular syntax of a query and by empirical observations of the Optimizer. The Optimizer's automatic recognition can be disabled from the SQL query, if desired.

Specific Optimizer strategies are described for various access scenarios. For each scan method (i.e., heap scan, clustered index, and non-clustered index), the strategy adoped by the Optimizer can be summarized as follows.

Heap scan: Large I/O+MRU

Clustered index: Large I/O on data pages+MRU

Non-clustered index: Large I/O on leaf level pages+No-MRU.

Others: Large I/O+MRU (e.g., temporary tables and text/image)

Additional strategies are described multi-table access during processing of join queries.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
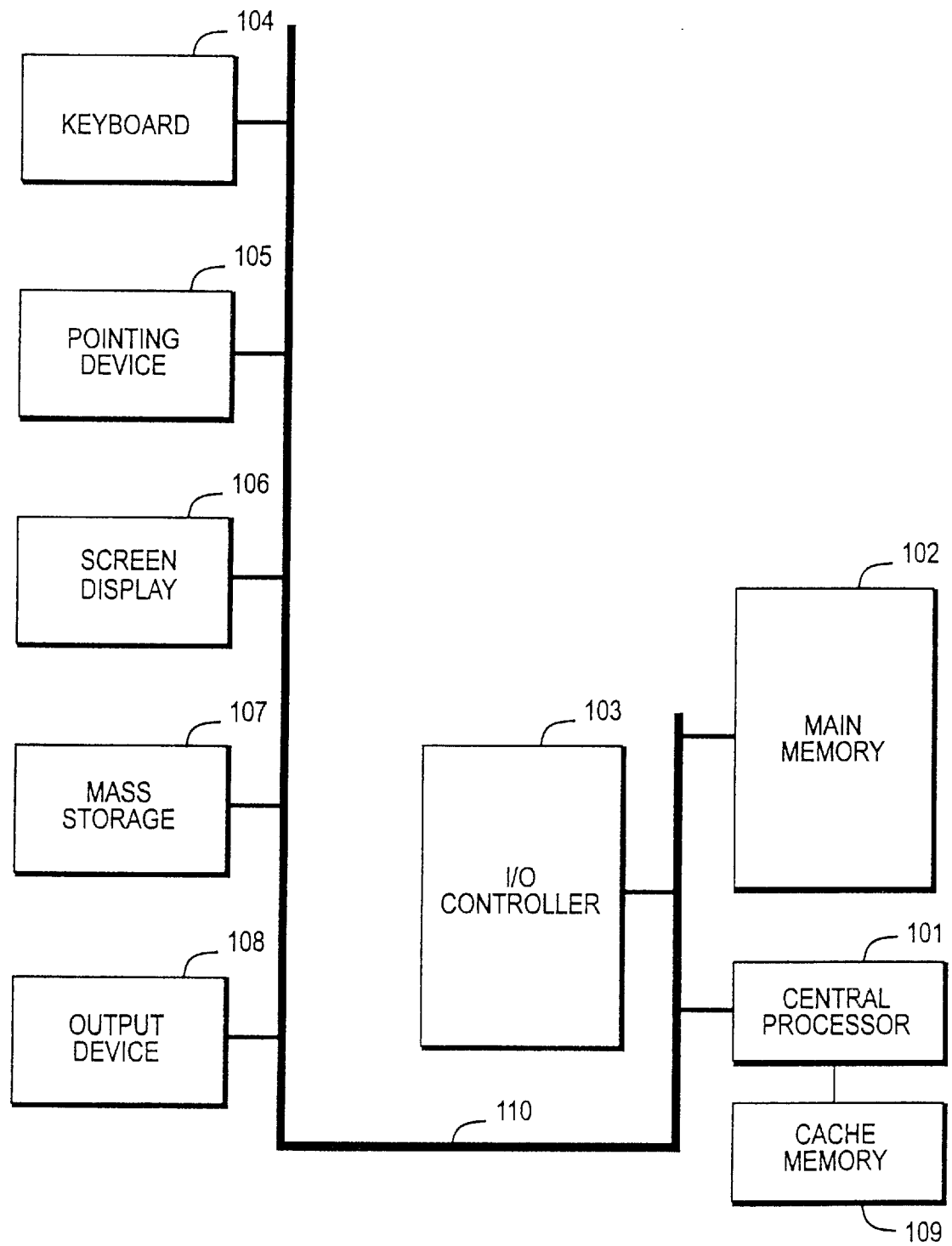
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
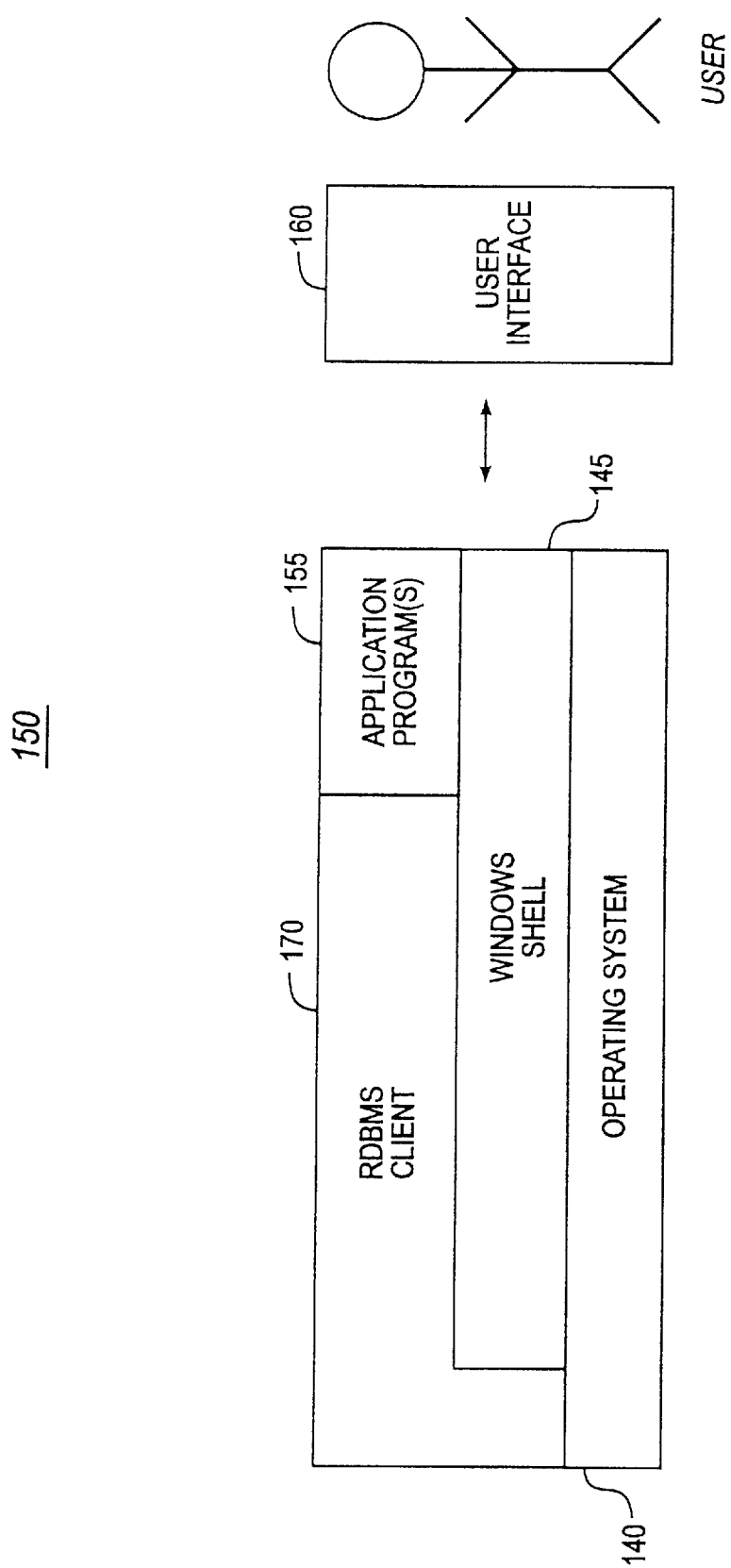
FIG. 1B is a block diagram of a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software programs 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing database tables from a SQL database server operating in a Client/Server environment.

Client/Server Database Management System

Figure 2:
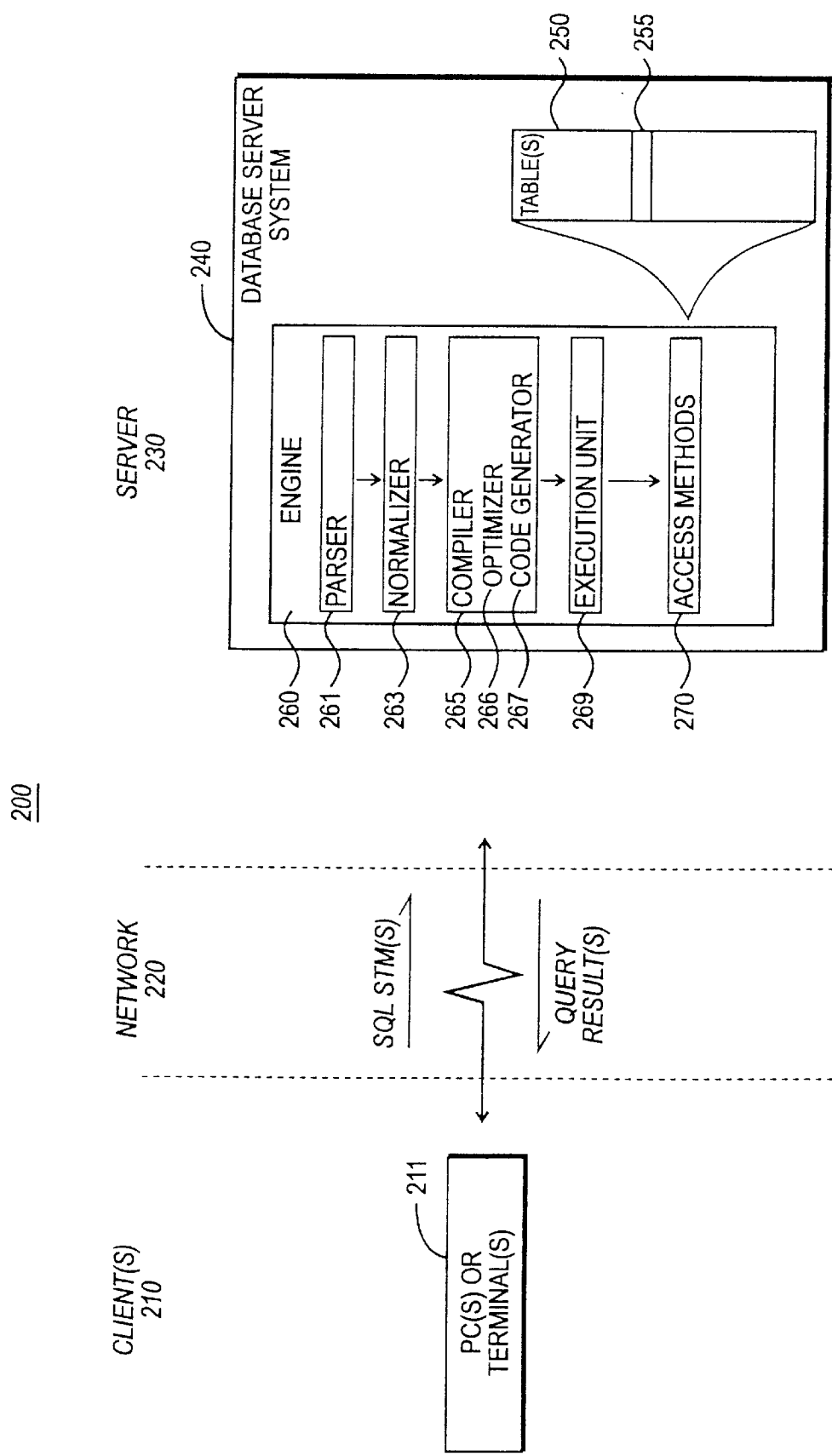
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a Client/Server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (available from Sybase, Inc. of Emeryville, Calif.) in an exemplary embodiment, generally operates as an independent process (i.e., independently of the Clients), running under a server operating system such as Microsoft Windows NT (Microsoft Corp. of Redmond, Wash.), NetWare (Novell of Provo, Utah), UNIX (Novell), or OS/2 (IBM). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server System 240.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Client(s) issue one or more SQL commands to the Server. SQL commands may specify, for instance, a query for retrieving particular data (i.e., data records meeting the query condition) from the table 250. The syntax of SQL (Structured Query Language) is well documented; see, e.g., the above-mentioned *An Introduction to Database Systems*. In addition to retrieving the data from Database Server tables, the Client(s) also include the ability to insert new rows of data records into the table; Client(s) can also modify and/or delete existing records in the table.

For enhancing the speed in which the Database Server stores, retrieves, and presents particular data records, the Server maintains one or more database indexes on the table.

A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. Alternatively, instead of storing unique record numbers, a "clustered" index may be employed. This is an index which stores the data pages of the records themselves on the terminal or leaf-level nodes of the index.

In operation, the SQL statements received from the one or more Clients 210 (via network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer 263 performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods 270 being invoked during query execution.

The Code Generator 267, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. After the plan has been executed by the Execution Unit, the Server returns a query result or answer table back to the Client(s).

Query optimization

A. Cache overview

In operation, the SQL Database Server has a certain amount of memory at the server available for its use. Typically during configuration of this system, the DBA (Database Administrator) user has indicated how much memory is available for the database server to use. This establishes a region of server memory which is available for caching.

In conventional database systems, the following approach is employed for cache management. A single policy is applied to the cache that information (e.g., data pages) is brought into the cache and remains there until it is "aged" out (i.e., discarded per a standard LRU scheme). Since, in a conventional database system, a single buffer cache is typically employed, contention exists at the buffer among multiple clients in those systems. When one client has locked (i.e., exclusive access to) the cache, others must wait. An additional bottleneck occurs with disk input/output (I/O). In a conventional transaction-based database system, I/O operations typically occur in small chunks, such as 2K. Often, however, the disk devices employed in such systems are optimized for larger I/O transfers, such as 16K or 32K.

One approach to addressing the foregoing problem is to create a "buffer pool." A buffer pool comprises multiple fixed-size buffer caches, typically 2K in size. Although the approach addresses the issue of one client blocking another (i.e., by a lock held at the cache), the approach itself does not provide for the binding of objects to particular buffer caches. With the evolution of microprocessors from 32-bit processors to 64-bit (and higher) processors, however, increasingly larger amounts of memory are available to database systems for caching. The present invention recognizes that subjecting large amounts of memory to a single cache policy is not a good strategy. Quite simply, such an approach is not able to make effective use of all of the available memory. In particular, one caching scheme for the entire address space leads to more contention among the various clients.

Further, conventional systems typically employ a fixed block size. Here, a block size is chosen at the outset and then remains in place, until reconfigured at a later point in time (e.g., by the user). The present invention also recognizes, therefore, that the conventional approach does not provide for optimization of block I/O transfer, such as may be achieved by adjusting block I/O size.

B. Improved cache

As previously-described in Applicants' co-pending application Ser. No. 08/273,867, U.S. Pat. No. 5,680,573 the Database Server uses an improved caching methodology, one employing "named caches." Viewed at a high level, the system of the present invention divides available cache on a per client or per task basis, thereby shielding one client or machine from another. More particularly, the system (under user control) segments the memory so that one or more particular buffer caches are created. Further, the user can assign a name to each cache, thereby creating a "named cache" for each. In response to such a request, the Database Server (internally) creates another instance of a buffer cache—that is, a buffer cache object, complete with access to methods for maintaining the buffer cache, including, for example, maintenance of LRU (least-recently used) and most-recently used (MRU) page chains. The DBA user can instruct the system to create a plurality of such buffer objects, for instance, up to 64K in a particular embodiment.

Memory management occurs in a hierarchical fashion as follows. Within each named cache, the user can configure pools. A "pool" is, in essence, a block size from a particular buffer cache. The user can instruct the system to create multiple pools within each named cache. At this point, the user typically specifies a preferred block (I/O) size, such as 2K, 4K, 18K, 16K, or the like. Each pool is represented by its own M/LRU chain. Upon configuration by the user, a hierarchical memory scheme exists.

After creation of the hierarchical memory structure, the user can instruct the system to "bind" an entity to a named cache. An "entity" is any article or object in the database which is supported by database pages and can be identified uniquely (e.g., by a "key"). Examples include tables, indexes, images, text, and the like. In general, therefore, these are objects which contain multiple pages and can be uniquely identified. By allowing a user to "bind" such an object to a named cache, the system in essence allows the user to break apart contention for the resources of different objects. In this manner, for instance, the user can break out tables used for decision support queries (i.e., those employed in Decision Support Systems or DSS) from those employed for transaction processing (i.e., OLTP or Online Transaction Processing). During system configuration, the binding of a particular object to a named cache is specified through SQL commands. Thereafter, the fact that a particular object is bound to a named cache is transparent to clients— that is, the client has no idea (nor need the client be concerned) where the object exists in memory.

The user may place more objects in a particular named cache, such as placing four objects in a single cache. When more objects are placed in a cache, however, contention for that particular cache will typically increase, all things being equal. In a preferred embodiment, therefore, the granularity of cache configuration (i.e., how many objects placed in a particular cache buffer) is therefore preferably controlled by the user.

Figure 3:
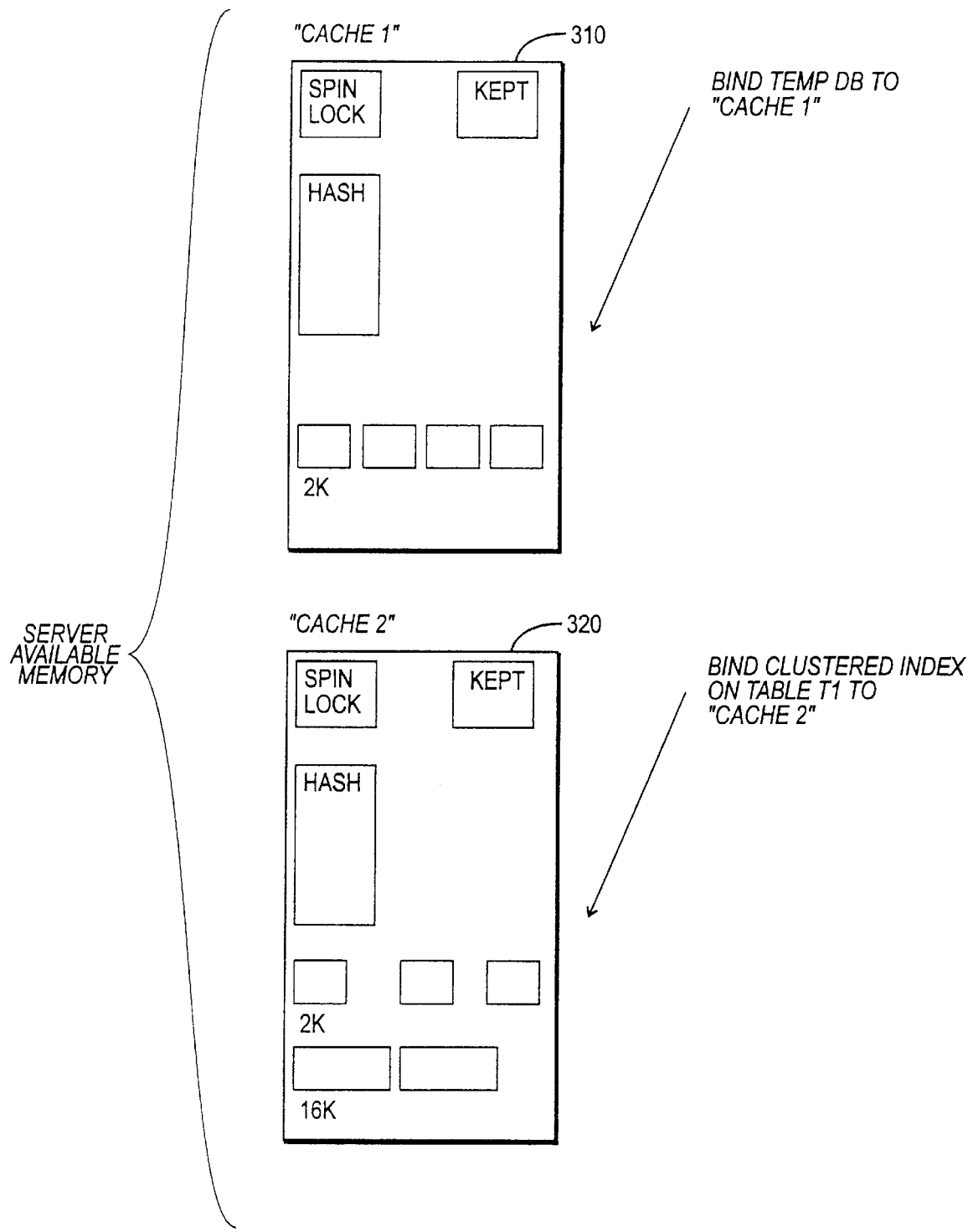
FIG. 3 is a block diagram illustrating the organization of "named caches" in memory.

FIG. 3 is a block diagram illustrating the organization of "named caches" in memory. Named cache 1 (310) and named cache 2 (320) are instances of the cache object. As shown, each named cache includes a hash table and one or more LRU (least-recently used) chains (e.g., single 2K chain). The kept list simply indicates those pages which are currently "kept" in cache—that is, not placed on the LRU chain. In the example of FIG. 3, the user has bound a TEMP database to named cache 1 and bound a clustered index for table T1 to named cache 2.

Each of these cache instances includes access to cache methods. Methods are defined for hashing, reading from the cache, writing the cache to disk, and logging changes to the cache. The actual methods employed by each object can be controlled by the object bound to the cache. In the case of the TEMP table, for instance, the writing methods and logging methods can simply be set to NULL. A TEMP table, as commonly employed through various systems, is simply a temporary table maintained in memory (but not on disk). Methods for writing and logging the named cache which holds TEMP can be, in effect, eliminated, thereby improving performance. Other methods, such as those for reading, are inherited intact.

C. Query execution with "hints"

In general, a query against an object in a named cache proceeds as follows. A query submitted by a client is parsed by the Parser and then passed to the Optimizer. The Optimizer formulates a strategy which is communicated to the Compiler and Execution Unit as the "query plan." At query execution time, Access Methods are invoked for performing low-level access, as required by the query plan. Below the level of the Access Methods is the Buffer Manager and the I/O (input/output) modules.

In addition to the foregoing, the Optimizer, upon receiving the query, communicates with the Buffer Manager. The Buffer Manager is proficient at certain tasks, such as managing I/O size, pre-fetching, page numbers, caches, and the like. The Buffer Manager has no particular knowledge about the query, however. It does not, for instance, know anything about "SQL" (e.g., syntax) or query formulation. The Query Optimizer, on the other hand, knows how queries are formulated, and what the distribution of data is. It knows the dynamics of the query, such as what type of scan is to occur, how much data is expected to be returned, whether a join is specified, what is the locality of the data, and the like. Despite all this knowledge about the query, the Optimizer knows nothing about caches.

According to the present invention, therefore, the Optimizer communicates with the Buffer Manager for formulating a query plan. For instance, the Optimizer may query the Buffer Manager for the purpose of determining whether the object of interest (e.g., table or index to be scanned) exists in its own buffer cache (i.e., whether it has been bound to a particular named cache). If the object exists in its own cache, the Optimizer may inquire as to how much of the cache (i.e., how much memory) the object requires, together with the optimal I/O size for the cache (e.g., 16K blocks).

Based on this information, the Optimizer formulates a query strategy or plan with "hints." Specifically, the Optimizer creates during formulation of the query plan "hints" which are passed to the Cache or Buffer Manager. By formulating "hints" for the Buffer Manager at the level of the Optimizer, knowledge of the query is in effect passed down to the Buffer Manager so that it may service the query using an optimal caching strategy—one based on the dynamics of the query itself. Based on the "hints" received from the Optimizer, the Buffer Manager can fine tune input/output for the query.

The Optimizer communicates the query plan to the Compiler. After compiling the plan, the Compiler passes the plan to the Execution Unit for executing the query. Execution is carried out by invoking lower-level Access Methods which, in turn, invoke the Cache or Buffer Manager. The Buffer Manager can then take this information and apply its knowledge of caches, for further optimizing cache operation. Based on this information, for example, the Buffer Manager may decide to do large I/O transfers, pre-fetching, and the like.

The Optimizer has different strategies it can communicate to the Buffer Manager, depending on the dynamics of the query and the cache. Consider a query specifying a join of two tables, specifically an inner table with a relatively larger outer table. In such an instance, the query is satisfied by constantly scanning the inner table and, on occasion, scanning the outer table. For this scenario, the Optimizer can instruct the Buffer Manager to place the buffer for the outer table on the LRU list. In this manner, the buffer for the outer table can be reused (i.e., before the cache is flooded with other information). Based on the dynamics of the query, therefore, the Optimizer can communicate different strategies to the Buffer Manager.

The Optimizer picks a strategy in a manner which is transparent to the user application. Therefore, the user application does not require any special calls or logic to invoke this functionality of the Optimizer. In a preferred embodiment, however, the user application has the option of overriding the strategy chosen by the Optimizer. In such an instance, the user or client application can force a particular strategy. This is helpful in those instances where the client has better knowledge than the Optimizer can derive.

D. Communication link between Buffer Manager and Optimizer

During query execution, actual communication between the Buffer Manager and the Optimizer occurs through the session descriptor, sdes. The session descriptor serves as a handle on a "scan," such as a scan of a table, index, or the like. The query strategy for the scan is accessible through the session descriptor. The session descriptor, in effect, serves as a general API (Application Programming Interface) used to communicate with the Buffer Manager. For example, the session descriptor may be employed to request a particular page for a particular object in the cache. When the Buffer Manager is called for a particular page, it may in turn look at the strategy, using the session descriptor.

Figure 4:
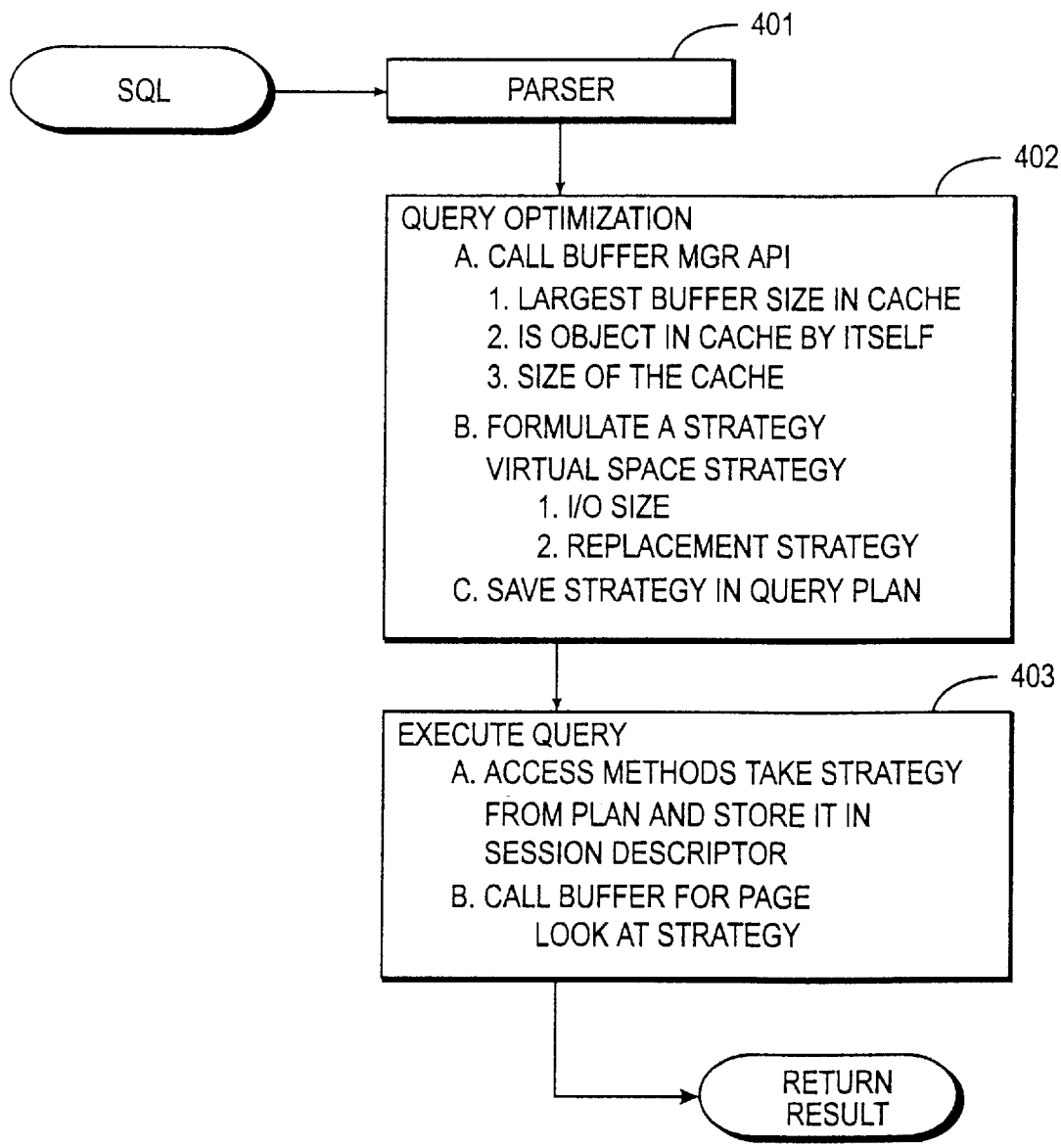
FIG. 4 is a block diagram providing an overview of query optimization, from the perspective of communication between a Buffer Manager and Optimizer of the present invention.

FIG. 4 is a simplified block diagram 400 providing an overview of query optimization, from the perspective of the communication between the Buffer Manager and the Optimizer. Upon receiving a parsed SQL expression from Parser 401, the Optimizer at 402 invokes the Buffer Manager API to query about certain features and aspects of the cache. For instance, the Optimizer asks the Buffer Manager what is the largest buffer size in cache and if the object to be scanned is currently in cache. It may also ask the Buffer Manager about the size of the cache itself. From the information it elicits, the Optimizer formulates a query strategy. The strategy, which itself is stored in the query plan, includes "hints" to the Buffer Manager. The query plan is passed to the Execution Unit for execution, at 403. Here, the Access Methods take the strategy from the plan and store it in the session descriptor. The actual calls to the Buffer Manager for pages (e.g., data pages) include an examination of the strategy and hints, for optimizing caching.

E. Hints

In an exemplary embodiment, two types of hints are employed: prefetch size and replacement strategy. The "prefetch" size, the first hint, is employed for I/O operations. "Prefetch" is the amount that the system retrieves or fetches in addition to the amount requested. If, for instance, a request is made for one data page, the system might additionally fetch or "prefetch" the next page into cache, on the likelihood that it might soon be needed.

Two types of prefetch exist: "hard" prefetch and "soft" prefetch. In a soft prefetch, if the system cannot fetch or retrieve the requested size (e.g., because sufficient memory does not exist), it will fetch the size which best matches the request (given that the request itself cannot be satisfied exactly). In a hard prefetch, in contrast, the amount prefetched must satisfy that which was requested. If the amount requested is unavailable for some reason, the system will nevertheless wait until it can satisfy the hard prefetch request alternatively, a value (e.g., NULL) can be returned, indicating that the client is to handle the inability to perform a hard prefetch. For example, if much contention exists for a particular size which has been requested for a hard prefetch, the system will wait until that size is available (or return). A hard prefetch is typically employed in those instances where system operation is greatly improved by large buffer I/O, such as when needed for creating a database. A hard prefetch will generally not be employed within the main transaction path.

Replacement strategy, the second hint, is the strategy employed for "buffer reuse." Here, the system adopts a "most-recently used" (MRU) replacement strategy, as opposed to the conventionally-employed LRU strategy. MRU replacement is the strategy of linking a page which has been used back to the LRU (least-recently used) side of the LRU chain, instead of the MRU side which is typically employed. Thus, this hint indicates that the system suspects that it might not need this particular page again, so the page is marked for indicating that it should be preferentially "bumped" (paged out) from the cache.

This "fetch and discard" or reverse strategy is useful in situations where the system suspects that particular buffers will not be reused. Consider a query which simply scans the table:

SELECT COUNT* FROM<tablename>

For this query, the Optimizer knows that it would be inefficient to displace existing pages from cache—filling cache memory with data pages which are not likely to be re-used (anytime soon). Accordingly, buffers used for the query are linked to the end of the reuse chain such that their buffers are available for immediate reuse. The MRU's strategy is generated both by the particular syntax of a query and by empirical observations of the Optimizer. The Optimizer's automatic recognition can be disabled from the SQL query, if desired.

F. Optimizer (1) Runtime operation

In basic operation, the Optimizer looks at the user query and at the cache configuration at that particular time and decides, based on that information, what is the most optimal way of executing the query. The goal of the Optimizer is to execute a query fast (i.e., increase performance), but not at the expense of other concurrent users. For a given a user query, the system will access certain tables. For a particular table, the Optimizer finds out from the Buffer Manager which buffer caches the table is bound to. In other words, the Optimizer gets the table-to-cache binding from the Buffer Manager for the tables involved in satisfying the query.

The Optimizer now proceeds as follows, for a particular table. The Optimizer will analyze every available index for the table for determining what is the best index for the query. In particular, for every index it analyzes, the Optimizer contacts the Buffer Manager to get the cache binding for that index. Note, at this point, that the index could be bound to a different cache. In addition to obtaining the cache binding, the Optimizer also determines (via the Cache or Buffer Manager) whether the object is the only object in cache. If it is the only object in cache and the size of the object is smaller than the cache size, the Optimizer may adopt a strategy which assumes the whole object will be cached and, therefore, that there will be no physical I/O for the object. If, for instance, all the data pages are in cache already, it may be quicker to just read the pages (i.e., perform a table scan), as opposed to fetching index pages which are not in cache.

In addition to examining whether the object is the only object in cache, the Optimizer also determines what buffer pools are available in that cache. The remaining system memory (heap) is available for use as a cache. The memory can be divided into disjoint caches. Within each cache, the system can perform I/O operations in particular block sizes. For a given object (e.g., resident in a cache), the system can perform I/O operations using different block sizes, thus providing the ability to adjust the block size for a given object when the context of use of that object changes. Consider a database table comprising a plurality of data pages. In OLTP applications, typically the system will access only a particular page at a time (e.g., for posting a transaction). Here, a smaller I/O size (e.g., 2K) is typically employed.

For a DSS application, in contrast, large amounts of data are needed from the object (i.e., the database table). A typical DSS query would ask, "give all customers having purchases above a certain amount." To satisfy such a query, the system would need to fetch most if not all data pages. Since several pages will be accessed, performance gains are realized when large block I/O transfers are employed.

(2) Locality of reference and prefetch clustering

If the pages themselves are scattered across a disk (i.e., not located in a contiguous location), then no performance benefit will be realized by larger block I/O size. According to the present invention, the Optimizer handles this situation by optimizing "locality of reference"—attempting to maximize contiguous objects (e.g., pages) to achieve prefetch clustering. Here, the Optimizer adopts a strategy which leads to locality of reference. In other words, the Optimizer selects a strategy which increases the effectiveness of large block I/O reads, by choosing a strategy (e.g., employing a particular index) which leads to contiguous objects (e.g., data pages).

To satisfy a query, for instance, the Optimizer can choose to employ an index so that the pages desired are contiguously arranged on the storage device. For instance, when a clustered index is available and the query requires a scan in the same order as the clustered index, the Optimizer may identify the resulting locality of reference—that is, that the objects will be located contiguously on disk. Similarly, when traversing the leaf-level pages of a non-clustered index, the Optimizer may again identify locality of reference—that the leaf-level pages are located in a contiguous fashion.

The Optimizer may also identify a locality of reference for the "heap" (e.g., non-clustered objects in memory). For instance, non-clustered data pages are allocated in increasing order and will, therefore, have locality of reference. In other words, for a table in memory without a clustered index (e.g., audit log), data pages may be simply appended to the end and, thus, may be candidates for locality of reference.

(3) Logical I/Os and physical I/Os

Based on the foregoing information, the Optimizer formulates an access plan that minimizes logical I/O operations. For a given logical I/O, the Optimizer performs a logical I/O to physical I/O transformation or mapping. Here, "logical I/O" is an input/output operation which occurs anytime cache must be accessed. If the desired object (e.g., page) already exists in cache, then that logical I/O operation will not constitute a physical I/O operation. If nothing resides in cache, then every logical I/O results in a physical I/O operation. This illustrates, of course, that the translation from logical I/O to physical I/O depends on cache configuration.

(4) Statistical model

Figure 5:
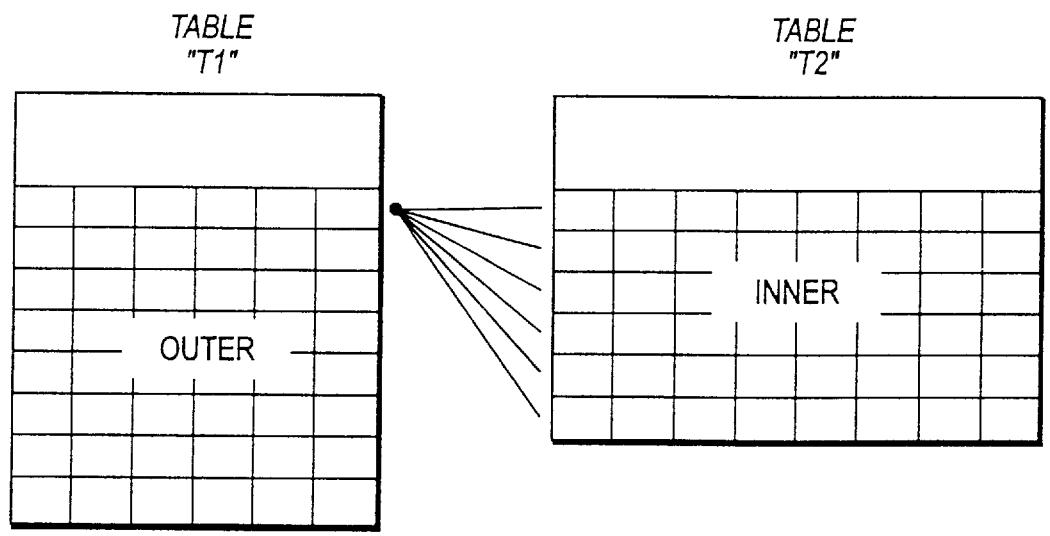
FIG. 5 is a diagram illustrating a Cartesian product performed between two tables, an outer table T1 and an inner table T2.

According to the present invention, a new statistical model for caching is employed. This is generally useful when doing database "join" operations. This is perhaps best explained by example. Consider, as shown in FIG. 5, a query 500 involving a Cartesian product between two tables: an outer table T1 and an inner table T2. For every row of the outer table T1, the system will be accessing each row of the inner table T2. If table T2 will fit in cache, then only the processing of the first row of T1 results in a physical I/O operation for table T2. The remaining scans of T2 (for the other rows of T1) will all be logical I/O operations. Thus, if the inner table T2 is small with respect to available cache, the entire table remains in cache after a single scan. As a result, as new rows of the outer table T1 are processed, they will find the T2 pages already in cache. If the cache is small, on the other hand, then each scan of T2 (for each row of T1) will lead to at least one physical I/O operation.

Figure 6:
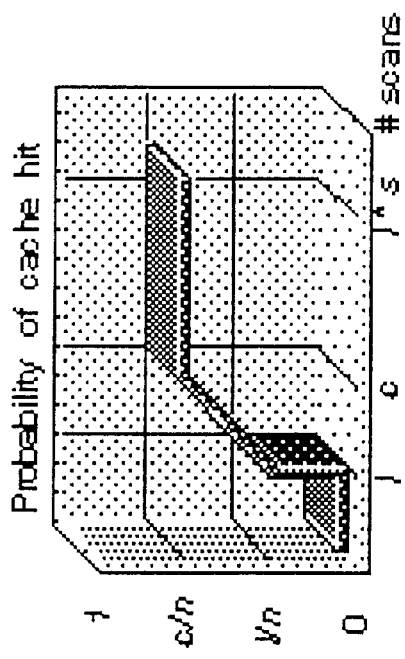
FIG. 6 is a graph illustrating a statistical cost model of the present invention, for modeling the probability of a cache "hit."

With an understanding of this example, the statistical cost model 600 of the present invention, shown in FIG. 6, may now be understood. Here, l is the logical pages per scan of the inner table. In a general join scenario (which is not necessarily a Cartesian product) of the inner table, how many pages which satisfy the join condition is specified by l. The number of scans is specified by s. Here, this is equal to the number of rows of the outer table, as the inner table will be scanned once for each row of the outer table. The available cache size (specified in number of pages) is indicated by c; this is information returned by the Buffer Manager. Finally, the number of pages in the table is indicated by n. Based on this information, the page misses (and thus physical I/O reads required) can be calculated as follows:

$$\text{Number of Page Misses} = l + (l \times s - l) \times (1 - c/n) + (c - l)^2 n$$

This information may be employed by the Optimizer for choosing a particular join order. Given two different tables, such as tables T1 and T2 above, two different join orders may result. Each has the same number of logical I/O operations, yet not necessarily the same number of physical I/O operations. Thus in making a decision about which join order to employ, the system of the present invention bases its decision on the cache configuration which is available.

Figure 7:
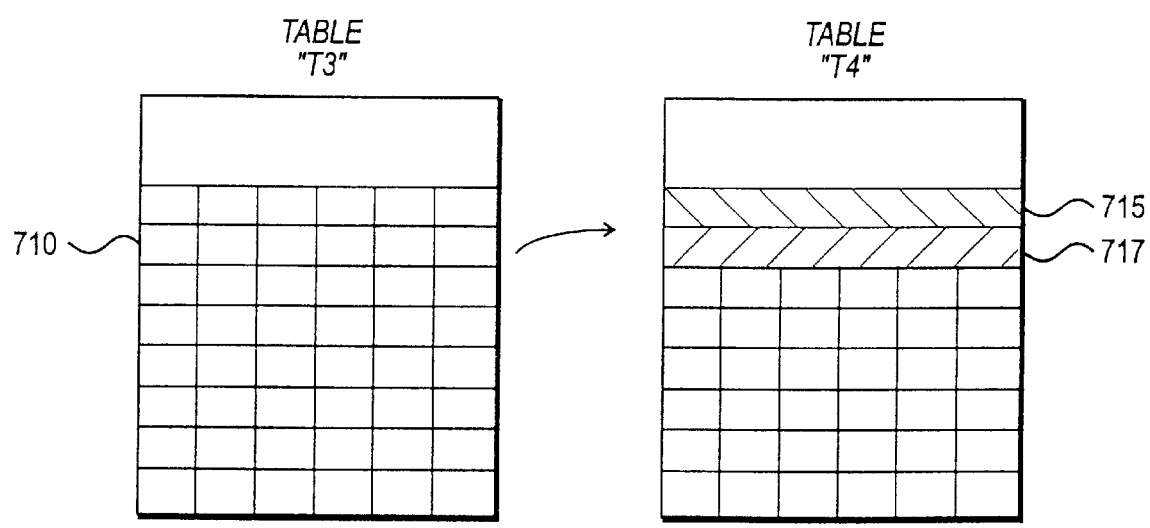
FIG. 7 is a diagram illustrating two tables, T3 and T4, where an increase in block I/O size will minimize the number of physical I/O operations required for performing a "join" on the two tables.

In addition to selecting join order at this point or stage, the Optimizer also suggests a particular block I/O size. Consider two tables, T3 and T4 shown in FIG. 7. For a given row 710 in table T3, suppose further that two rows of T4 qualify (i.e., rows 715, 717). Here, the rows of T4 (i.e., rows 715, 717) exist on adjacent pages. Recognizing this, the Optimizer will increase the block I/O size at this point or stage to minimize physical I/O. This "clustered-index join" occurs in the common instance of a join on a key field for which a clustered index is ordered by. In other words, the index for both tables are such that the join key is a prefix of each index.

In the system of the present invention, a different block size is chosen for index pages than is employed for data pages. The approach employed is as follows. For a clustered index object (e.g., Sybase SQL Server table), 2K blocks are employed for index pages. For data pages, 2K blocks or larger (depending on the number of pages that satisfy) are employed. For non-clustered index objects, 2K blocks are employed for non-leaf level pages. For leaf pages, 2K blocks or larger are employed (depending on pages that qualify). Stated generally, therefore, when accessing items which might be clustered, the system tends to employ larger block I/O sizes. At a higher level (e.g., when traversing non-leaf pages), the items are either not clustered or not of interest as a group even if they are clustered.

(5) Operation of Fetch and Discard strategy

Consider a database operation in which a scan of a large table is required. As previously described, when the table is larger than the cache, the table might "wipe out" the cache which may be in use by other queries—that is, displacing the current cache items with that portion of the large table being scanned. According to the present invention, when the Optimizer detects a scan of a large table, one which will use up most if not all of the cache, the Optimizer selects the "fetch and discard" strategy. Here, pages brought into the cache are marked such that they are immediately "bumped out" (i.e., discarded) from the cache when new pages are loaded into the cache. Here, the Optimizer skews the aging strategy so that the just-fetched pages are the first to be discarded. In addition to applying the strategy to scans of large tables, the Optimizer can also apply this strategy to "work" or TEMP tables. Work tables are those which are temporarily needed at run time and then are discarded. Here, the Optimizer, as soon as it is finished scanning the work table, it marks the corresponding pages such that they are preferentially discarded from cache. Similarly, for join operations, the Optimizer can apply the strategy to the outer table to keep the inner table in cache.

Although the Buffer or Cache Manager acts on the strategy provided by the Optimizer, the Manager may at times elect not to follow the strategy. One instance in which the Buffer Manager will not follow the strategy provided by the Optimizer is when the pages have been brought in by a different process. Consider a scenario where user #1 brings in a page for an OLTP application. Suppose in this scenario that another user, user #2, is running a DSS (Decision Support System) application which requires access to the same page. Here, the request by the second user to discard the page after it has been fetched will be ignored by the Optimizer which knows that the page was brought in by another process. In an exemplary embodiment, the Buffer Manager maintains a flag indicating whether a page is already "in use." If a page is already in use by another user or process, the Optimizer will ignore a request to discard that page.

Internal operation

Internal operation of the system of the present invention is perhaps best described by examining the API which the Buffer Manager surfaces to the Optimizer.

A. Entry point: startscan

The main entry point for the Access Methods is startscan. This is the entry point by which the Access Methods gain access to one of the database tables of choice in a query. At this point, therefore, the query has been compiled by this system to produce a plan. Here, the system is executing the query, based on the plan.

The startscan method presumes that the table which is about to be scanned has been "opened." A table is opened by a call to an opentable method which returns the session descriptor, sdes. In an exemplary embodiment, the session descriptor may be constructed as follows (the well-documented, standard C Programming Language):

```
typedef struct sdes
{
struct syb_buf *skeepbuf[KEEPNUM]; /* kept buffer array within sdes
*/
    struct auxkeepbufs *sauxkeepbufs; /* ptr to aux kept bp array */
    int sbufskept; /* count of kept buffers in skeepbuf array */
/*
    ...
/*
    cacheid_t sicache; /* id of cache the index is bound to */
    B1VARDEC(SLID, ssave_dbhurdle) /* used in B1 disk refit to retain
      ** database level (hurdle) information
      */
    long serrid; /* Error return from called functions */
    int32 sscancnt; /* startscan count on this table */
    uint32 sstat2; /* second set of status bits */
    int extaffinity; /* affinity of external table scan */
/*
    ...
*/
    short suid; /* uid of user who opened table */
    short sgid; /* gid of user who opened table */
    int32 sinscan; /* scan active on this table */
    int32 sgetpage; /* getpage count on this table */
    int32 sbufread; /* read i/o on this table */
    struct scandes *sscanp; /* ptr to descriptor for special scan */
/*
    ...
*/
    struct des *sdesp; /* pointer to DES */
/*
    ...
*/
    /* Used for clients of cache manager */
    VS_STRATEGY svs_strategy; /* virtual space strategy for scan */
    int32 sindlevel; /* leaf or non-leaf level of current scan */
    int slkprom_lvl; /* Lock promotion info */
} SDES;
```

The sdes includes, in effect, a handle on the table scan (i.e., includes context information describing the scan). The sdes data structure includes information which the caller—the Optimizer—has placed in the query plan. Information stored here in the sdes, referred tM as the "strategy," serves as a means by which the Optimizer communicates with the Buffer Manager.

B. Virtual space strategy

In an exemplary embodiment, the strategy itself may be implemented using the standard C Programming Language as follows:

```
/*
** Virtual Space Strategy structure to be used by clients of the buffer
** manager. This structure holds strategy information about how to obtain
** and manage buffers. Clients of the buffer manager can place hints
** in this structure and the buffer manager will use these hints in the
** acquisition of memory.
*/
typedef struct vs_strategy
    uint32   vstrategy;
    int32    vsize;
    int32    vdirection;
}VS_STRATEGY;
```

The VS_STRATEGY data structures includes an enumerated (#define) type, which serves as a "virtual space" strategy. Other data members include size and direction. The size indicates what size the caller is interested in, for I/O strategy. The direction indicates whether the scan occurs in a forward or backward (or indexed) direction.

The strategies themselves may be defined as:

```
#define VS_STRTGY_NULL            0x00000000
#define VS_STRTGY_PREFETCH_SOFT   0x00000002
#define VS_STRTGY_PREFETCH_HARD   0x00000004
#define VS_STRTGY_BUF_REUSE       0x00000008
#define VS_STRTGY_IDXPREFETCH     0x00000010   /* Prefetch index pages */
```

```
#define VS_STRTGY_PREFETCH_LIST      0x00000020   /* Prefetch list of pages */
#define VS_STRTGY_WASH_NOUNPIN       0x00000040
/*
** Supported virtual space strategies:
**
**    VS_STRTGY_NULL - No special strategy.
**
**    PREFETCH_SOFT - Tells the buffer manager that a prefetch size will be
**            in the vsize field and that if this size of prefetch
**            cannot be obtained, return whatever closest size
**            is available.
**    PREFETCH_HARD - Tells the buffer manager that a prefetch size will be
**            in the vsize field and that if this size cannot be
**            obtained, return NULL and the caller will take the
**            appropriate action.
**    BUF_REUSE - Tells the buffer manager to link the buffers (after a
**            bufunkeep) to the LRU side of the MRU/LRU instead of
**            the MRU side. This can be useful for certain queries
**            which may read every page of a table and never look at
**            the pages again.
**
**    IDXPREFETCH - Tells the buffer manager to prefetch index pages
**            (Currently not supported)
**    PREFETCH_LIST - Tells the buffer manager to do an asynchronous list
**            prefetch. (Currently not supported)
**
**    WASH_NOUNPIN - When washing buffers do not attempt to wash buffers
**            that are pinned to a PLC. This is used by the XLS
**            to stop the infinite loop of plc_flush->log new page
**            -> buf wash -> un pin data buffer -> plc_flush . . .
*/
```

As shown, a NULL strategy tells the Buffer Manager to use whatever kind of buffers are available. A "prefetch soft" strategy tells the Buffer Manager to perform an "implicit prefetch." Here, the caller is interested in a particular page and the Buffer Manager will prefetch ahead a certain amount of pages for the caller (in essence doing a large I/O operation). The implication of "soft" is that the Buffer Manager might not be able to do a prefetch of the requested size. By specifying a "soft" prefetch, the caller indicates that the Buffer Manager should find the closest size to the prefetch and perform the fetch for that closest size.

For a "hard" prefetch, in contrast, the Buffer Manager will "sleep" on the buffer waiting for the requested size to become available, or simply return (e.g., NULL) back to the client. In other words, for a "hard" prefetch, the Buffer Manager must return the requested size; otherwise, it sleeps on the buffer (at LRU) until the requested size becomes available in the buffer, or returns to the client that the operation failed. While the particular thread is sleeping on the buffer, other threads in the system may continue their execution. "Buffer reuse" (BUFF REUSE) is a strategy which instructs the Buffer Manager to hook, not to the MRU side of the chain, but to a point in the MRU/LRU chain which is closer to the LRU side. Here, the Optimizer thinks that the page will not be referenced again (for purposes of cache management). The "index prefetch" (IDXPREFETCH) strategy instructs the Buffer Manager to prefetch index pages, as well as data. In the currently preferred embodiment, it is not supported. The "prefetch list" (PREFETCH_LIST) strategy instructs the Buffer Manager to perform an asynchronous list prefetch. The caller gives the Buffer Manager a list of pages. After returning the first page of the list, the Buffer Manager will in the background perform the necessary I/O operations for getting the other pages into cache. In the currently preferred embodiment, this strategy is not supported.

Finally, the "wash no unpin" (WASH_NOUNPIN) strategy is a strategy for use by the private log cache (PLC). This instructs the Buffer Manager not to perform an I/O operation in the process of getting a buffer since the system is operating in a critical section (e.g., flushing a private log cache).

C. Startscan

The basic function prototype (with preamble) for startscan is as follows.

```
/*
**   STARTSCAN - initiate a scan of a table
**
**   entry conditions:
**       sdes->sargp - array of search args
**       sdes->sargcnt - number of elements
**       indexid - SCAN_RID, SCAN_NOINDEX, or the indexid
**       mode - SCAN_NORMAL or SCAN_FIRST
**           or SCAN_BACK or SCAN_LASTPAGE
**
**   Parameters:
**       sdes - session descriptor (with possible previous calls
**           to initarg(), setarg().
**       indid - index to use or special define of
**           SCAN_RID - user supplied RIDs
**           SCAN_NOINDEX - no index
**           SCAN_CLUST - use clustered index
**       mode - type of scan including:
**           SCAN_NORMAL - find all qualifing rows
**           SCAN_FIRST - caller only will need first row
**           SCAN_BACK - scan table backwards
**           SCAN_NODATA - or'ed with above. Indicates that a
**               nc index scan does not need to return data page
**           SCAN_LIST - sdes is on a table of RIDs (collection
**               of keyless n.c. index leaf pages); the RIDs
**               are passed to getrow() along with 'dsdes',
**               the table containing the data the RIDs
**               point to
**           SCAN_LASTPAGE - scan last data page only
**               of keyless n.c. index leaf pages)
**
**   Returns:
**       nothing
**
**   Side Effects:
```

-continued

```
**      Determines the lower and upper limits of the scan.
**      Checks the qualifing rows on the lower page. Changes
**      the following sdes elements:
**          sstat - sets SS_DATA, SS_NODATA bits
**          slow - initialized
**          scur - initialized
**          shigh - initialized
**          sqoff - holds qual rows from scur page
**          sqoff[SDESMAX-2] holds starting pos for SCAN_BACK
**          sscanlist - set up with the SDES to use to fetch data;
**              this will always be the input SDES, except
**              for SCAN_LIST mode, where the calling function
**              will set it to the auxiliary SDES, dsdes.
**          sscancnt - incremented
**          sinscan - set to TRUE
**          sscanbuf - set to buffer address of first buffer scanned
**          sslcacheptr - set to first slice's slcache
**          scurslice - set to first slice
**
*/
void
startscan(SDES * sdes, int indexid, int mode)
{
/*
    Passes strategy down to lower level
    ...
*/
}
```

The startscan method is invoked with three parameters: sdes, indexid, and mode. The sdes parameter references the passed-in session descriptor. The indexid serves as an identifier or id for the index (if any) which is to be scanned. If indexid is set to 0, then the scan is performed without an index (i.e., only data). Indexid=1 identifies the clustered index (i.e., the one associated with a table having a clustered index). Greater than the value of 1, the indexid identifies various non-clustered indexes. At this point, the indexid is set to the index which the Optimizer has chosen as the most optimal. Mode specifies the type of scan. For instance, SCAN_NORMAL finds all qualifying rows.

In general operation, the caller of startscan has opened a table and has filled out information in the sdes with whatever strategy it desires to use. The caller then invokes startscan as the basic entry point to lower level routines.

D. Getpage

After invocation of the startscan method, the system determines whether it is scanning index or data. If it is scanning an index, startscan will invoke a searchindex method. If, on the other hand, it is scanning data, it will return the first page to the caller (which may then loop through the rest of the pages). In other words, at this point, the system must determine the first page for the scan. If the indexid is greater than 0, the system will get the root page of the index. On the other hand, if the indexid is equal to or less than 0, the system will get the first page (i.e., data page) of the table.

Whether through an index or directly from the table, the system employs a getpage method for getting all pages. In the instance of an index scan, the getpage method is invoked from the searchindex method. In the instance of data, startscan will call the getpage method. The functionality added by the searchindex method is that it will maintain information describing whether the system is currently at a leaf-level or non-leaf level of an index. The main entry point into the Buffer Manager itself is, therefore, the getpage method.

In an exemplary embodiment, the getpage method may be constructed as follows.

```
 1: /*
 2: ** GETPAGE - return a buffer holding a requested page
 3: **
 4: **   Getpage is provided an sdes with logical page number and dbid
 5: **   to locate. It examines the cache for the presence of the buffer
 6: ** and if not found, it locates a buffer and reads the page.
 7: **
 8: **
 9: **
10: **
11: **
12: ** Parameters:
13: **     sdes - session descriptor
14: **         page to read is in scur
15: **
16: ** Returns:
17: **     Buffer pointer holding the page. The buffer has been "kept".
18: **
19: ** Side Effects:
20: **     If the page isn't aleady in the cache, it will
21: **     grab a buffer to use (possibly causing disk writes
22: **     in the process), and read the page into it.
23: */
24:
25: BUF *
26: getpage(SDES * sdes)
27: {
28:
29:    BUF      *bp;
30:    BUF      *mass_ptr;
31:    BUF      *cachebp;
32:    int      io_type;
33:
34:    /* bump getpage counter */
35:    sdes->sgetpage++;
36:    /* assume that we are going to do a logical read */
37:    io_type = 0;
38:
39:
40:    MONEVENT_PAGE_REQUEST(sdes);
41:
42:
43: search_again:
44:    bp = bufsearch(sdes);
45:
46:    if(bp)
47:    {
48:       mass_ptr = bp->bmass_head;
49:       /*
50:       ** Desired page is already in the cache, and we now have its
51:       ** buffer kept. Wait if it is still being read in. Testing
52:       ** the BUF_READING bit without holding the spinlock is O.K.,
53:       ** because the only change possible while we have the buffer
54:       ** kept is that the bit can go off. The bit is rechecked by
55:       ** upsleepgeneric while it holds the sleepwakeup spinlock.
56:       */
57:       while (MASS_STAT(mass_ptr) & MASS_READING)
58:       {
59:          MONITOR_INC(mc_access(getpage_read_waits));
60:          (void) upsleepgeneric(SYB_EVENT_STRUCT(mass_ptr),
61:                (char *) &MASS_STAT(mass_ptr),
62:                sizeof (MASS_STAT(mass_ptr)),
63:                (long) MASS_READING, TRUE);
64:       }
65:
66:       /*
67:       ** If an IO error occurred while reading for this buffer,
68:       ** the IO completion routine brfinish() has already unhashed
69:       ** the buffer and bufread() has unkept the buffer. We unkeep
70:       ** the buffer here as well. The unkeep which brings 'bkeep'
71:       ** to zero will free the buffer as well.
72:       */
73:       if(MASS_STAT(mass_ptr) & MASS_IOERR)
74:       {
75:          bufunkeep(bp, sdes);
76:          goto search_again;
77:       }
78:
79:    }
80:    else
```

-continued

```
 81:   {
 82:
 83:      /*
 84:      ** No buffer for desired page in hash table.
 85:      ** Get a buffer for reassignment from bufgrab.
 86:      */
 87:
 88:      bp = bufgrab(sdes);
 89:
 90:      /*
 91:      ** Bp is now ours alone.
 92:      ** Try to hash it (assign it to the page we want).
 93:      ** Bufhash sets BUF_READING, so that no one will
 94:      ** try to use the buffer before we have read in the page.
 95:      */
 96:
 97:      if (cachebp = bufhash(bp, sdes))
 98:      {
 99:         /*
100:         ** Some one beat us to it. We probably won't have to
101:         ** read in the page, so we can throw away our grabbed
102:         ** buffer. Now we'll ALMOST certainly find the buffer
103:         ** that is already hashed when we re-search. We can't
104:         ** just use earlierbp, because it might have vaporized.
105:         ** Set not-hashed status in the buffer we grabbed, then
106:         ** unkeep it to destroy it. We already contaminated
107:         ** the buffer header with the new page number and such.
108:         */
109:
110:         MASS_STAT(bp->bmass_head) |= MASS_NOTHASHED;
111:         bufunkeep(bp, sdes);
112:         goto search_again;
113:      }
114:      else
115:      {
116:         /*
117:         ** Successfully hashed. Now read it in.
118:         */
119:
120:         io_type = 1; /* physical read */
121:
122:         MONEVENT_PAGE_IO(sdes);
123:
124:         bufread(bp, sdes);
125:
126:         /* Initialise its trips value */
127:         bufrripset(bp, sdes->sdesp);
128:
129:         sdes->sbufread++;
130:      }
131:   }
132:
133:
134:   MONEVENT_PAGE_GRANTED(sdes, bp->bpage->pindid,
135:             io_type, bp->bpage->pobjid);
136:   cachebp = bp;
137:
138:
139: /*
140:   HOUSEKEEPING FOR SPECIAL CASE -- DUMP/LOAD
141:   . . .
142: */
143:
144:
145:   /*
146:   ** For debugging purposes, check that this page matches the
147:   ** the table id the caller expected.
148:   */
149:   if((bp->bpage->pobjid != sdes->sdesp->dobjectc.objostat.objid)
150:      && !(sdes->sstat & SS_NOCHECK))
151:   {
152:      wrongpage(bp, sdes, 1);
153:   }
154:
155:   return (bp);
156: }
(line numbers added to facilitate description)
```

As shown, the method is invoked with a single parameter, sdes. The caller has placed the page number in the sdes for the page which the caller is concerned with—that is, the page which the method is to get. At lines 34–35, the method increments an getpage counter, for tracking how many times the method is called for this scan. This is an indication of how many pages the method tried to get. At lines 36–37, the method initializes a local variable, io_type, to 0, for indicating that the method initially assumes that it is going to perform a logical read (i.e., get the page from cache). At line 40, a macro is employed for setting up event housekeeping information, for event posting/performance monitoring.

At line 43, a label, search-again, is set up, for allowing the method to conveniently return to this point. Next, at line 44, the method calls a bufsearch, which searches for the page in cache. Like the getpage method, bufsearch takes an sdes parameter. The parameter stores information indicating which page is of interest. The bufsearch method call represents a call into the Buffer Manager itself.

The bufsearch call returns a buffer pointer, bp. If bp is not 0 (i.e., not NULL), then the method has found the page in cache. At this point, however, a race condition may occur. In particular, another task may be in the process of reading this page into cache but has not completed the process. Here, the current task may find a valid entry in the hash table for the page, yet the page itself might not yet have been read into the cache. At lines 46–79, therefore, the method tests whether the buffer pointer is non-NULL (line 46) and "sleeps" on the entry until the physical I/O is complete (lines 57–64). The determination that the physical I/O has completed is made by looking at the head of a "mass." A "mass," as described in further detail below, is simply a logical grouping of buffer structures (e.g., 2K structures). In essence, the state of the mass is always kept in the head. If an I/O error occurred while attempting to read this buffer, the buffer has already been unhashed (tested at line 73). In such a case, the method will "unkeep" the buffer and then loop back to the previously-described search_again label.

In the instance where the page is not in cache (i.e., bp is NULL), at line 46, the method proceeds to the "else" statement, beginning at line 80. Here, at line 88, the method calls a bufgrab method, for grabbing a new buffer from the least-recently used side of the chain. That buffer is now hashed into the hash table. Note that, at this point, the physical I/O operation for the page has not been undertaken. At this point, therefore, other tasks may call getpage and "see" the page in cache—that is, before the physical I/O for the page has been completed.

At line 97, the method tests whether an attempt to hash the buffer reveals that the page is already in cache (from the hash table's point of view). In such a case, another task has "beat" the current task. In such an instance, the current task does not have to read in the page and may, therefore, throw away the grabbed buffer, at lines 110–111. At this point, the method can simply re-search for the page, by performing a "goto" to the search_again label. Upon performing this loop, the method will search for the page in cache again and will find it. If the physical I/O operation for the page is still underway, the method will sleep on it, as previously described.

If the hashed buffer is not already in cache (at line 97), the method enters the "else" statement, at line 114. Here, the buffer has been successfully hashed and may now be read. At line 120, the method sets the io_type to the value of 1, for indicating a physical read. At line 122, a macro is employed for monitoring events, for performance analysis. At line 124, the actual read (i.e., physical I/O) operation is performed. At line 127, the method invokes a buftripset method. In essence, objects can be favored, for keeping them around in cache. This is done by use of a "trips" value. When it is set to a value greater than 0, it indicates that when the buffer gets to the LRU end of the chain, the method will decrement the "trips" count and link the buffer back to the MRU end of the chain. In other words, the buffer will not be reused but will, instead, "trip" through the cache multiple times, thereby favoring the object in cache. At line 129, the method increments a sbufread data member stored in sdes, for indicating that the buffer is read.

At line 134, a macro is employed for performance analysis. Then, at line 136, the local buffer pointer of the cache, cachbp, is set equal to the buffer pointer for the current task, bp. At this point, the page which is desired is in cache. Either the page was found already in cache, or it has been read into cache. At lines 140–142, the method performs housekeeping operations for dump/load operations, which are not relevant to the present invention. At line 146–153, the method performs error checking. In particular, the method checks to make sure that the page is that which the caller expected. This catches data corruption errors and the like. If no error is found, the method concludes by returning the buffer, at line 155.

Figure 8:
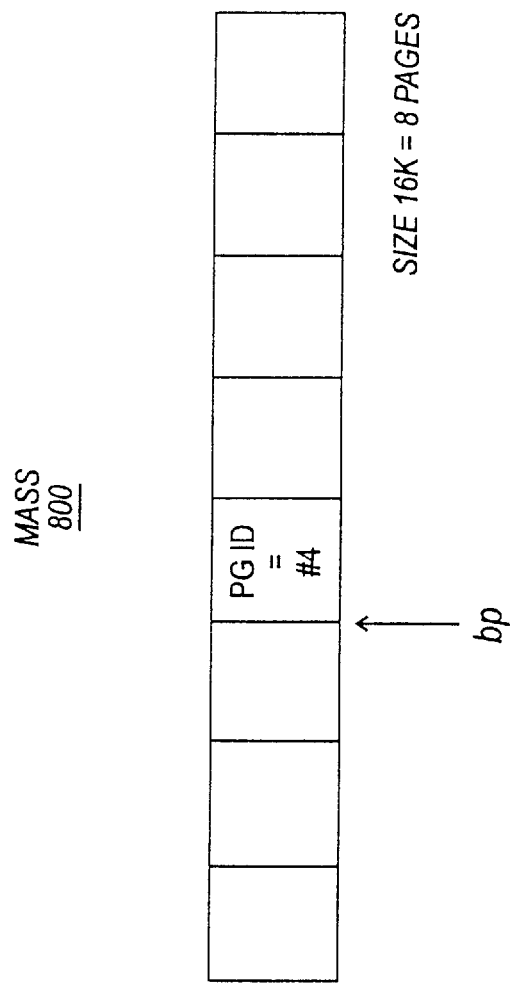
FIG. 8 is a block diagram of a "mass" structure, which is a logical grouping of storage units (e.g., 2K units).

The significance of the foregoing method in terms of buffer strategy will now be described. Consider a request for a buffer, for instance, which requests a 16K I/O transfer for page #4. In other words, this is a request with a starting page of page #4 and a size of 16K (i.e., eight 2K pages). At the level of invocation of the bufgrab method, the request includes a prefetch request. The system will, at this point, re-align the page request to be aligned with an extent boundary. An "extent" is a set of contiguous pages, such as eight pages. What the Buffer Manager actually does is return a pointer to the requested page (i.e., #4) inside a "mass." As shown in FIG. 8, a "mass" is a logical grouping of buffers of a particular size, such as a group of 2K buffers. The Buffer Manager will return a buffer pointer, bp, to the requested page within the mass, such as page #4 as shown in the figure. In response to the foregoing request, therefore, the system actually completes a 16K I/O operation, bringing in eight pages. All subsequent requests, through the getpage method, for pages in the mass result in the mass being found in cache and a pointer (bp) being returned to the particular buffer within that mass which is desired. The actual size of the mass employed can be fine tuned to the particular storage device from which the information is read. Each of the masses of a particular size (e.g., 2K masses) is linked to its own LRU chain. In this manner, the system knows exactly where to locate each size buffer which is required.

With an understanding of masses, the bufgrab method will not be described in further detail. In an exemplary embodiment, the method may be constructed as follows.

```
 1: /*
 2: ** BUFGRAB()
 3: **
 4: ** This routine returns a buffer to be reassigned to a different
 5: ** page. An LRU scheme is used to decide which buffer to return.
 6: **
 7: ** The buffer is returned kept.
 8: **
 9: ** Parameters:
10: **    sdes -- ptr to session descriptor (in which to keep the buffer)
11: **    keep -- specification of which keep slot to use
12: **
13: ** Returns:
14: **    pointer to buffer header for buffer to be reassigned
15: **
16: ** MP Synchronization:
17: **    Acquires and releases cache_spin lock.
18: **    Buffer is returned kept.
19: **    No kept buffers are on the LRU chain.
20: **    All dirty MASSes on LRU chain must have valid bdbtable
          pointer.
21: **
22: ** Side Effects:
23: **    May cause MASS(es) to be written to disk, either individual
24: **    dirty MASSes, or the dirty MASSes for the log.
25: **
26: */
27: BUF *
28: bufgrab(SDES * sdes)
29: {
30:     BUF        *mass_ptr;
31:     BUF        *target_buf;
32:     CACHE_DESC *cache_desc;
33:     pgid_t         start_pageno;
34:     pgid_t         requested_pageno;
35:     int32      prefetch_size;
36:     int32      requested_size;
37:     cacheid_t      cid;
38:     SPINLOCK *cache_spin;
39:
40:     MONEVENT_BUF_GRAB_BEGIN(sdes);
41:
42:     /*
43:     ** Find the cache that the memory request wiil be directed to.
44:     */
45:     cid = GET_CACHE_ID(sdes);
46:     cache_desc = Resource->rcaches [cid];
47:     cache_spin = cache_desc->cspin;
48:
49:     requested_size = sdes->svs_strategy.vsize;
50:
51:     prefetch_size = buf_validate_mass_size(sdes, cache_desc,
52:            &start_pageno, &requested_pageno
53:            );
54:     /*
55:     ** Call the cache manager to get physical memory resources.
56:     ** NOTE that the cache manager may decide to re-align
57:     ** this request if the buffer size we request us unavailable.
58:     */
59:     P_SPINLOCK(cache_spin);
60:
61:     mass_ptr = cm_grabmem(cache_desc, sdes->sdesp->ddbid,
62:            &start_pageno,
63:            requested_pageno, prefetch_size,
64:            sdes->svs_strategy.vstrategy, TRUE, TRUE);
65:
66:     if (mass_ptr != (BUF *) NULL)
67:     {
68:         /*
69:         ** The mass we just grabbed will be reused for
70:         ** another page. Unhash it so that the old page
71:         ** can no longer be found in cache and keep the
72:         ** buffer so that it is no longer available for
73:         ** replacement.
74:         */
75:         buf_unhash_and_keep_grabbed_mass(sdes, mass_ptr,
76:                requested_pageno,
77:                &start_pageno);
78:
79:         target_buf = mass_ptr + (requested_pageno - start_pageno);
80:
81:     }
82:
83:     /* release spinlock and return the buffer */
84:     V_SPINLOCK(cache_spin);
85:
86:     /*
87:     ** Increment the appropriate monitors.
88:     */
89:
90: /*
91:     PERFORMANCE MONITORING
92:
93:     ...
94: */
95:
```

```
 96:
 97:    virtmap(sdes, mass_ptr, start_pageno);
 98:
 99:    MONEVENT_BUF_GRAB_END(mass_ptr);
100:
101:    return (target_buf);
102: }
```

As shown, the method is invoked with the session descriptor, sdes. Recall that the sdes includes the page number which is of interest. Also, the sdes has been updated to indicate what level of the index the system is currently on, for this page which is to be retrieved. At line 40, the method employs a macro for event monitoring/performance analysis. At lines 42–47, the method finds the cache that the memory requests will be directed to. Specifically, at line 45, the method employs a macro to get the cache ID, from the sdes. In other words, at this point, the macro extracts the cache ID for the page which is of interest. This determines what "named cache" is to be employed. That ID, now stored in a local variable cid, will be translated into a cache descriptor, at line 46.

At line 47, the method obtains the spin lock (synchronization) for that cache. This is available via the cache descriptor. A spin lock is a multi-processor synchronization mechanism. As is known in the art, a spin lock is a synchronization mechanism, such as a mutex (mutually-exclusive access), except that with a spin lock the process or thread does not "sleep" on the lock. Instead, it "spins"—continues to execute waiting for the lock to be lifted. By spinning instead of sleeping, the process avoids the overhead and cost of a context switch. Most often, spin locks are employed for access to critical resources.

Next, at line 49, the method stores the size specified in the strategy to a local variable, requested_size. At line 51, the method attempts to validate the mass size by calling a buf_validate_mass_size, passing the sdes (which includes the page number), the cache descriptor, a starting page number, and a requested page number. The system must, at this point, check several things. The request should not cross an extent boundary, nor should the request cross an allocation page boundary. Upon completion of this separating call, a local variable, prefetch_size, is set. At line 59, the method actually employs the spin lock for the cache.

At line 61, the method calls a "Physical" Cache Manager. The Physical Cache Manager is the module which understands the cache descriptors, the LRU chain and their physical linkage, and the like. In essence, the Physical Cache Manager is the interface to the hardware. The manager is invoked by calling a grab memory method, cm_grabmem. The method is invoked with a starting page number, a requested page number, the prefetch size, and the strategy. The call, in effect, instructs the Physical Cache Manager to grab a mass. After going to the LRU chain, the method will return a mass (via a mass pointer).

At line 66, the method tests whether a valid mass pointer was obtained (i.e., not equal to NULL). Since the mass has just been grabbed from the LRU chain, the old page which it stores is unhashed at lines 75–77, so that the old page can no longer be found in cache. This, in effect, "kicks" the old page out of cache. At this point, any page stored in the mass is "clean" (i.e., would have already been flushed to disk if it had been "dirty" and, therefore, may be simply kicked out from cache. At line 79, the method sets up the target buffer pointer, target_buf for pointing to the offset into the mass which is of interest (i.e., page). This is simply computed by taking the difference between the requested page number and the start page number and adding this to the mass pointer.

At lines 83–84, the spin lock (multi-processor synchronization) is released. Monitoring information, for performance analysis, may be optionally employed at lines 83–94. Performance monitoring is not necessary for understanding the method herein. In general, at this point, the system would simply monitor whether the prefetch request was increased or decreased, or satisfied as requested.

At line 97, the method invokes a virtmap method for mapping the page a number to a virtual page number (i.e., mapping logical page to disk offset), in preparation for a physical I/O. Here, the buffer is unlinked from the LRU chain, with a pointer to the buffer being stored in sdes. At line 99, the final event monitoring/performance analysis macro is employed. At line 101, the method concludes by returning a pointer to the target buffer (i.e., the pointer computed in line 79).

Now, the cm_grabmem method, which serves as an interface to the Physical Cache Manager, will be described in further detail. In an exemplary embodiment, the method may be constructed as follows.

```
1: /*
2: **
3: **   CM_GRABMEM
```

```
 4: **
 5: **     This routine returns a buffer to be reassigned to a different page.
 6: **     An LRU scheme is used to decide which buffer to return.  This
 7: **     routine will also spend sveral cycles looking for an appropriate
 8: **     sized MASS for the desired request.  A request for a prefetch may
 9: **     come in such that there are no MASSes configured for that prefetch,
10: **     therefore we'll look for the closest sized MASS configured.
11: **     Conversely, a request may come in for a 2k page and there are no 2k
12: **     buffer configured. Again we'll search for the closest sized
13: **     MASS to 2k that has been configured.
14: **     This routine assumes that the caller has also called
15: **     cm_validate_mass_size to make sure that it is ok to use the
16: **     requested I/O size.
17: **
18: **  Parameters:
19: **      cache_desc      - Pointer to cache descriptor.  This is the
20: **                        cache for which the caller wants memory
21: **                        for a page or set of pages.
22: **      dbid            - Database id of pages that caller whishes to
23: **                        assign buffers to.
24: **      start_page      - Ptr to starting logical page number of request
25: **                        (used for prefetch only).
26: **   requested_page - The actual logical page # requested by the caller.
27: **      prefetch_size   - Number of bytes requested.  If this is a
28: **                        prefetch; this will be > SYBPAGESIZE.  A
29: **                        negative size indicates a prefetch direction
30: **                        of behind.
31: **      strategy        - Virtual space strategy supplied by the caller.
32: **                        Currently only two strategies are supported:
33: **
34: **                        VSO_STRTGY_PREFETCH_SOFT - Indicates that the
35: **                               but caller wants a prefetch done if
36: **                               possible will accept whatever the cache
37: **                               manager can deliver.
38: **                        VSO_STRTGY_PREFETCH_HARD - Indicates that the
39: **                               caller wants exactly the prefetch size
40: **                               requested and nothing else.
41: **
42: **  Returns:
43: **      pointer to MASS
44: **
45: **  MP Synchronization:
46: **      This routine MUST be entered with the cache's spin lock held.
47: **
48: **  Side Effects:
49: **      May cause MASS(es) to be written to disk, either individual
50: **      dirty MASSes, or the dirty MASSes for the log.
51: **
52: */
53:
54: BUF *
55: cm_grabmem(CACHE_DESC * cdesc_ptr, dbid_t dbid, pgid_t * start_pageno,
56:            pgid_t requested_pageno, int32 prefetch_size, int32 strategy,
57:            int wash_flag, int wait_flag)
58: {
59:      BUF           *mass_ptr, *tempbp;
60:      BUF_POOL_DESC *bpool_desc_ptr;
61:      int           i;
62:      int           dont_do_prefetch;
63:      int           search_direction;
```

41

```
 64:        int       requested_prftch_size;
 65:        int       pools_searched;
 66:        int       no_pool_found;
 67:        int       waited;
 68:        cacheid_t cid;
 69:
 70:        cid = cdesc_ptr->cid;
 71:
 72:        if (prefetch_size > SYBPAGESIZE)
 73:        {
 74: find_buf_pool:
 75:            pools_searched = 0;
 76:            dont_do_prefetch = FALSE;
 77:            requested_prftch_size = prefetch_size;
 78:            no_pool_found = TRUE;
 79:
 80:            /*
 81:            ** Set the search direction for searching the cache
 82:            ** descriptor for a suitable buffer pool.  If the request is
 83:            ** for a prefetch larger than SYBPAGESIZE we'll start
 84:            ** searching from the requested size down to SYBPAGESIZE,
 85:            ** however if the request is for a SYBPAGESIZE buffer we'll
 86:            ** start searching the 2k buffer pool and work our way
 87:            ** up.  There has to be at least one buffer pool with
 88:            ** available buffers somewhere in that range.
 89:            */
 90:            if (prefetch_size > SYBPAGESIZE)
 91:                search_direction = CM_SRCH_LOWER;
 92:            else
 93:                search_direction = CM_SRCH_HIGHER;
 94:            do
 95:            {
 96:                CM_FIND_BPOOL(cdesc_ptr, prefetch_size,
 97:                              bpool_desc_ptr);
 98:                /*
 99:                ** If the requested prefetch size is not configured
100:                ** then keep trying the next lowest size until we
101:                ** hit the minimum size configured for this cache.
102:                */
103:                if (search_direction == CM_SRCH_LOWER)
104:                    prefetch_size /= 2;
105:                else
106:                    prefetch_size *= 2;
107:
108:                /*
109:                ** First check to see if any buffers have been
110:                ** initialized in this pool.  If there have been
111:                ** we'll check to see if the pool has been
112:                ** configured with a sufficient amount of buffers in
113:                ** it (i.e. if the pool was configured too small
114:                ** than all of the buffers in it might be kept).  In
115:                ** this case we'll keep searching for a buffer pool.
116:                */
117:                if (bpool_desc_ptr->btotal_masses != 0)
118:                {
119:                    if (!CM_LRU_EMPTY(bpool_desc_ptr))
120:                        no_pool_found = FALSE;
121:                }
122:            }while ((no_pool_found) && (pools_searched++ < MAX_BUFPOOLS));
123:        }
```

42

```
124:    else
125:    {
126:        bpool_desc_ptr = cdesc_ptr->cpools[BUF_POOL_2K];
127:        no_pool_found = FALSE;
128:    }
129:
130:    /*
131:    ** Couldn't find a buffer pool that had any available buffers in
132:    ** it. Post a message to the errorlog and then tell the client the
133:    ** buffer resource are unavailable.
134:    */
135:    if (no_pool_found)
136:    {
137:        V_SPINLOCK(cdesc_ptr->cspin);
138:        ucierrlog(NOFAC_SERVER, MANAGER_NAMED_CACHE_TOO_SMAL,
139:                cdesc_ptr->cname, cdesc_ptr->cid);
140:        ex_raise(BUFFERM, NO_BUFFER_POOL_RESOURCES, EX_CMDFATAL, 1,
141:                cdesc_ptr->cname, cdesc_ptr->cid);
142:    }
143:
144:    /*
145:    ** If this turns out to be prefetch request look at the starting
146:    ** page of the request and the size to see if the prefetch would
147:    ** cross an extent boundary. If so then re-align the request to
148:    ** fit within the boundaries of an extent. Next check the page
149:    ** range to see if any of the pages within the prefetch range are
150:    ** already in cache. If so then we can't do this prefetch and
151:    ** we'll fall back to grabbing a 2k buffer.
152:    */
153:    if (bpool_desc_ptr->bsize > SYBPAGESIZE)
154:    {
155:        /*
156:        ** At this point we've found a MASS that's available. However
157:        ** if it is not the size that we requested, we must check to
158:        ** see that the requested page will fall within the prefetch
159:        ** range. If the size is greater than what was requested
160:        ** all we need to do is realign the starting page so that the
161:        ** prefetch will not cross the extent boundary. If the size
162:        ** is less than what was requested we check to see if the
163:        ** requested page will still be in the prefetch range if we
164:        ** do a prefetch with the available MASS. If not don't waste
165:        ** any more cycles here, simply fall back to the SYBPAGESIZE
166:        ** pool and fulfill the request with a singe SYBPAGESIZE
167:        ** buffer.
168:        */
169:
170:        if (bpool_desc_ptr->bsize > requested_prftch_size)
171:        {
172:            CM_ALIGN_START_PAGE(*start_pageno,
173:                        BUFS_IN_MASS(bpool_desc_ptr->bsize));
174:        }
175:        else if (bpool_desc_ptr->bsize < requested_prftch_size)
176:        {
177:            /*
178:            ** See if the requested page is still within the
179:            ** prefetch range. If not then we can't do this
180:            ** prefetch.
181:            */
182:            if ((requested_pageno < *start_pageno) ||
183:                (requested_pageno > (*start_pageno +
```

43

```
184:                    BUFS_IN_MASS(bpool_desc_ptr->bsize) - 1)))
185:            {
186:                *start_pageno = requested_pageno;
187:                dont_do_prefetch = TRUE;
188:            }
189:
190:
191:    /*
192:    **  Given a page range covering an extent, find if any pages in the page
193:    **  range are in cache or will overlap if a prefetch of the requested
194:    **  size is done. NOTE that this routine ASSUMES that the hash buckets
195:    **  are clustered along the extent boundary.  That's ok since we'll
196:    **  never enter this routine UNLESS the cache has been configured with
197:    **  prefetch pools and thus the hash buckets are clustered by extent.
198:    **  This routine should only be called from cm__check_page_range since
199:    **  it is intended to be an optimized way of quickly verifying a page
200:    **  range for prefetch and NOT A GENERAL PURPOSE EXTENT HASH SEARCH.
201:    */
202:
203:
204:            if ((dont_do_prefetch) ||
205:                (cm__check_page_range(cdesc_ptr, *start_pageno, dbid,
206:                        bpool_desc_ptr->bsize) != PAGE_RANGE_OK))
207:            {
208:                /*
209:                **  Either one of the pages in the range is in cache
210:                **  and kept or something else is wrong.  If this is
211:                **  a soft request, just get a single buffer.
212:                **  Otherwise this is a hard request and the caller
213:                **  really wanted a MASS of the requested size.  In
214:                **  that case we'll raise an error.
215:                */
216:                if (strategy & VS_STRTGY_PREFETCH_SOFT)
217:                {
218:                    MONITOR_INC(mc_buffer(cid, buf_prftch_retry));
219:                    prefetch_size = SYBPAGESIZE;
220:                    goto find_buf_pool;
221:                }
222:                else
223:                {
224:                    V_SPINLOCK(cdesc_ptr->cspin);
225:                    ex_raise(BUFFERM, NO_BUFFER_POOL_RESOURCES,
226:                        EX_CMDFATAL, 2, cdesc_ptr->cname,
227:                        cdesc_ptr->cid);
228:                }
229:            }
230:       }
231:       /*
232:       ** Tend to the wash section of the pool before grabbing, to keep
233:       ** those clean MASSes flowing for subsequent grabs.  First
234:       ** increment the wash deficit to reflect the fact that we will
235:       ** shortly be removing a MASS from the wash.
236:       **
237:       ** But if there is not currently a deficit, leave the wash to the
238:       ** next caller.  If the monitors show that grab is still frequently
239:       ** having to wait for writes to finish on dirty MASSes, then two
240:       ** possible remedies are: 1) doing the wash every time instead, or
241:       ** 2) increasing the size of the wash section.  Which one to choose
242:       ** depends in part on how often bufsearch finds its buffer in the .
243:       ** wash
```

44

```
244:        */
245:        if (bpool_desc_ptr->bwashdeficit++ > 0)
246:        {
247:             // cache washing used to keep clean buffers available
248:             // ...
249:
250:        }
251:
252:        /*
253:        ** After calling cm__cache_wash (or if there was no deficit), there
254:        ** must be a MASS in the wash section of the LRU queue.
255:        ** The MASS may still be in I/O if cm_cahce_wash found it dirty.
256:        ** Since we hold the cache spin lock, we have one MASS in the
257:        ** wash that will get ahead of any other bufgrab.
258:        **
259:        ** One option is to search the entire wash section, just in case
260:        ** there is one MASS there that is immediately grabbable.
261:        ** A different option is always to choose the MASS at the extreme
262:        ** LRU end, even if it is in I/O.
263:        ** The advantages of the second option are that it may lower the
264:        ** cpu cost of cm_grabmem and it requires a bit less code.
265:        ** The advantages of the first option are that it may decrease the
266:        ** average latency in cm_grabmem, and it may carry on better during
267:        ** thrashing or if a wash I/O never completes due to some bug.
268:        ** [The above analysis is based largely on guesswork and intuition]
269:        **
270:        ** The second option is currently implemented: always go after the
271:        ** very least recently used buffer.
272:        **
273:        ** A deficiency of the current implementation is that when there
274:        ** is a dirty buffer at the LRU end, nobody can grab any buffers
275:        ** until its write finishes.  All nearly simultaneous grabs
276:        ** sleep waiting for the I/O to complete on the same MASS.
277:        */
278:
279: get_lru:
280:        mass_ptr = bpool_desc_ptr->bbufnew->bmass_prev;
281:
282:
283:        /*
284:        ** We cannot grab the MASS immediately if it is still dirty.
285:        */
286:        if (!(MASS_STAT(mass_ptr) & (MASS_DIRTY | MASS_WRITING)))
287:        {
288:             MONITOR_INC(mc_buffer(cid, grabclean));
289:        }
290:        else
291:        {
292:             /*
293:             ** The MASS is dirty, and the write must have been started
294:             ** already.  Or the MASS is being written because MASS_OFFSET
295:             ** is set.  Or the MASS aged into the wash with a
296:             ** write still pending (unlikely).
297:             ** But in any case, there is a write we must wait for.
298:             */
299:
300:             /*
301:             ** Wait for the write on the MASS to complete.
302:             ** A single buf__writewait is sufficient, because
303:             ** buffers are not allowed in the wash until they are
```

```
304:        ** just dirty.
305:        */
306:
307:        /*
308:        ** Even if the wait_flag is FALSE, we have to
309:        ** wait for the write to complete.  Otherwise,
310:        ** it is possible that the caller would search
311:        ** through cache again and call us to grab a
312:        ** buffer and we'd loop forever because the
313:        ** CPU isn't yielded to handle the I/O completion.
314:        */
315:        buf__writewait(mass_ptr);
316:
317:        /*
318:        ** While we waited for the write, the MASS may have
319:        ** changed identity, been coalesed or split.
320:        ** Thus we can not use this mass pointer. We
321:        ** have to return to the LRU.
322:        */
323:
324:        if (!wait_flag)
325:        {
326:            /*
327:            ** The caller didn't want to wait.
328:            ** Fix up the deficit since we won't really
329:            ** be grabbing a buffer.
330:            */
331:            bpool_desc_ptr->bwashdeficit--;
332:
333:            MONITOR_INC(mc_buffer(cid, nograb_nowaitdirty));
334:
335:            return((BUF *) NULL);
336:        }
337:
338:        MONITOR_INC(mc_buffer(cid, grabdirty));
339:
340:        goto get_lru;
341:    }
342:
343:    /*
344:    ** At this point, we know that we can grab the MASS safely.
345:    ** We unhash it and keep it to make it ours.
346:    ** Turn off the MASS_INWASH bit, because we have removed the MASS
347:    ** from the wash.  Also turn off the MASS_OFFSET bit, since it
348:    ** applied to the MASS's previous identity.
349:    */
350:
351:    /*
352:    ** Return the MASS to bufgrab so that the dbid can be placed in the
353:    ** MASS and it can be hashed before releasing the cache spinlock.
354:    ** This is done to avoid the race condition that can take place
355:    ** between bufdbclean and and bufreserve. If bufreserve grabs a
356:    ** MASS that belongs to the the database that bufdbclean is about
357:    ** to clean, we may have a situation where the caller of bufreserve
358:    ** has not had a chance to stuff the new dbid into the MASS when
359:    ** bufdbclean comes in and finds the buffer the kept buffer still
360:    ** belonging to the database as of its previous life.
361:    */
362:    /*
363:    ** Check whether we have saturated the cache with index buffers
```

46

```
364:        ** or OAM page buffers (because of btripslleft) and have no choice
365:        ** to grab a buffer that has the MASS_TRIP and may have a value of
366:        ** > 0
367:        */
368:        if ((MASS_STAT(mass_ptr) & MASS_TRIP) &&
369:            (MASS_TRIPS_LEFT(mass_ptr))) MONITOR_INC(mc_buffer(cid,
370:            saturatedgrabanyway));
371:        /*
372:        ** Now reset page reference bits in all pages in the prefetch
373:        ** range. Save some cycles and only do this if it's a true
374:        ** prefetch request.
375:        */
376:        if (mass_ptr->bsize > SYBPAGESIZE)
377:        {
378:            i = MASS_UNREF_CNT(mass_ptr) = BUFS_IN_MASS(mass_ptr->bsize);
379:            tempbp = mass_ptr;
380:            for ( ; i > 0; i--)
381:            {
382:                BP_STAT(tempbp) &= ~(BUF_PG_REF|BUF_PG_DESTROY);
383:
384:                tempbp++;
385:            }
386:        }
387:
388:        return(mass_ptr);
389: }
```

As shown, the method is invoked with eight parameters. The cache descriptor parameter, cache_desc, indicates which cache the method should process. The second parameter, dbid, is the database ID of the page which the system wishes to get the buffer for. Recall that the system is getting a clean buffer to read the page into. The page which the system starts reading from is indicated by the third parameter, start_pageno, which is the page number for this database. The fourth parameter, requested_pageno, is the requested page number. Recall that, because of alignment, the requested page number might not be the same as the starting page number. The requested page number will nevertheless be within the range. The prefetch_size parameter is simply the size of the number of bytes to prefetch. The strategy parameter specifies the strategy, as previously described. The wash_flag parameter, the seventh parameter, serves as a Boolean indicating whether the caller can tolerate a "wash" operation. "Wash" specifies how clean buffers are replenished in the LRU; here, "wash" is a mechanism for maintaining a list of clean buffers in the LRU. Finally, the wait_flag parameter specifies whether the caller can wait (e.g., for a buffer that may be pinned to the log).

At line 70, the method stores the cache descriptor ID into a local variable, cid. At line 72 the prefetch size is examined. If the prefetch size is greater than a standard selected unit (e.g., 2K defined by SYBPAGESIZE), the method will proceed to do the work to find a suitable buffer pool. Otherwise, the method takes an optimal path by going to lines 124–128, thereby immediately going to the 2K buffer pool.

In the instance where the prefetch size is greater than the standard unit (i.e., TRUE at line 72), then the method proceeds to line 74. Here, a label is established, find_buf_pool, for searching for the appropriate buffer pool. At this point, therefore, the method has a requested size that it will look for. The buffer pool is found as follows. At lines 75–78, local variables are initialized. With this cache and prefetch size, the method will return a pointer to a buffer pool descriptor. This is done at lines 94–97, after setting a search direction (lines 90–93). At lines 302–306, the method attempts a smaller prefetch size, in the event that the requested prefetch size is not configured.

At lines 117–121, the method tests whether it has located a buffer pool. If the total masses is not equal to 0 and the LRU end of the pool is not empty (i.e., there exists available buffers), the method has found an available pool. Accordingly, the flag no_pool_found is set to FALSE, at line 120. Otherwise, the flag is set to TRUE. The method then proceeds to loop on this condition at line 122. Upon finding a pool, the method drops out of the loop tested at line 122; the buffer pool descriptor is appropriately set up. Otherwise, the method will continue to search for the next lowest size buffer pool if the request which came in is greater than the standard SYBPAGESIZE (2K) unit, or the next highest size buffer for a request which is not greater than the standard unit. At line 135, the method tests whether it has found a pool. If not, an error is logged (line 138) and an exception is raised (line 140), which aborts the transaction.

Upon reaching line 153, a valid buffer pool descriptor exists. If its size is greater than the standard SYBPAGESIZE size, additional error checking is performed. The page range is validated for the buffer. If the range is invalid, the method sets a dont_do_prefetch flag. Thus, at lines 176–189, the method determines whether the page range fits within the size of the buffer. At line 204, the method checks whether a page in the range is already in cache and kept (i.e., find if any pages in the page range are in cache or will overlap if a prefetch of the requested size is done), or whether the dont_do_prefetch flag has been tripped (i.e., TRUE at line 204). If either condition holds true, an error has occurred. For a soft request, the method simply proceeds to get a single buffer. Specifically, the prefetch size is simply set equal to the standard 2K unit (SYBPAGESIZE), and the method executes a "goto" statement at line 220, for looping back to the find_buf_pool label. In other words, if the strategy is for a soft prefetch, the method will at this point simply resize the prefetch size and again attempt to find a buffer pool. Otherwise this is a hard request—the caller really wanted a MASS of the requested size. Accordingly, the method jumps to the "else" statement beginning at line 222 and raises an exception at line 225. At line 245, the method preforms the previously-mentioned cache "wash." This is does to keep "clean" buffers available.

Upon reaching line 286, the method is ready to undertake the steps to actually grab a buffer. There, the method gets the mass at LRU, with use of a MASS_STAT macro. If the mass is still dirty, the method will wait for the write (flush) to complete by entering the "else" sequence at lines 290–341. The call to buf—writewait drops the spinlock. After waiting, the method will loop back to the find_buf_pool label. Generally, however, the mass will be clean, from the previously-described "wash" operation; for a clean mass, event monitoring is (optionally) undertaken for performance analysis.

At this point, the method had successfully identified a buffer (more specifically, a mass) that it can get. Now, the method performs some bookeeping for performance monitoring (lines 363–370). At line 376, another 2K (SYBPAGESIZE) optimization is performed. Here, for a size greater than SYBPAGESIZE, the number of buffers unreferenced in the mass is equal to the number of buffers in the mass. Each buffer in a mass has a page reference bit (i.e., the buffer is referenced) and a page destroy bit (i.e., the buffer has been destroyed), which are maintained at line 382.

Optimizer strategies

A. Optimizer strategies provided to the Buffer Manager

The Optimizer makes a determination of which pages to cache and which ones to discard, and what are the scenarios for sequential prefetch. In general, two optimization strategies are employed by the Buffer Manager. First, the Optimizer determines whether the Buffer Manager should use large I/O (input/output) operations. Second, the Optimizer determines whether the Buffer Manager should use fetch-and-discard strategy. Based on the course of these determinations, the Optimizer will provide corresponding "hints" to the Buffer Manager.

For each query present in a user's application, the Optimizer makes an initial decision about index selection—which indexes to employ, if any. As part of this index selection process, the Optimizer determines the tradeoff of using an index versus simply scanning a table using large I/O technique. Specifically, the Optimizer faces different access choices. A first approach is a "heap scan"; this is simply scanning a table, without use of an index. As used herein, the term "heap scan" differs from that of "table scan." The term "table scan" refers to a scan without using an available index. The term "heap scan," on the other hand, refers to a scan when no index is in fact available. For query scenarios where the access is to be a heap scan, the Optimizer unilaterally makes the decision to employ large I/O technique, such as 16K block access (or, alternatively, 4K, 6K, 8K, 32K, or 64K block access).

Figure 9:
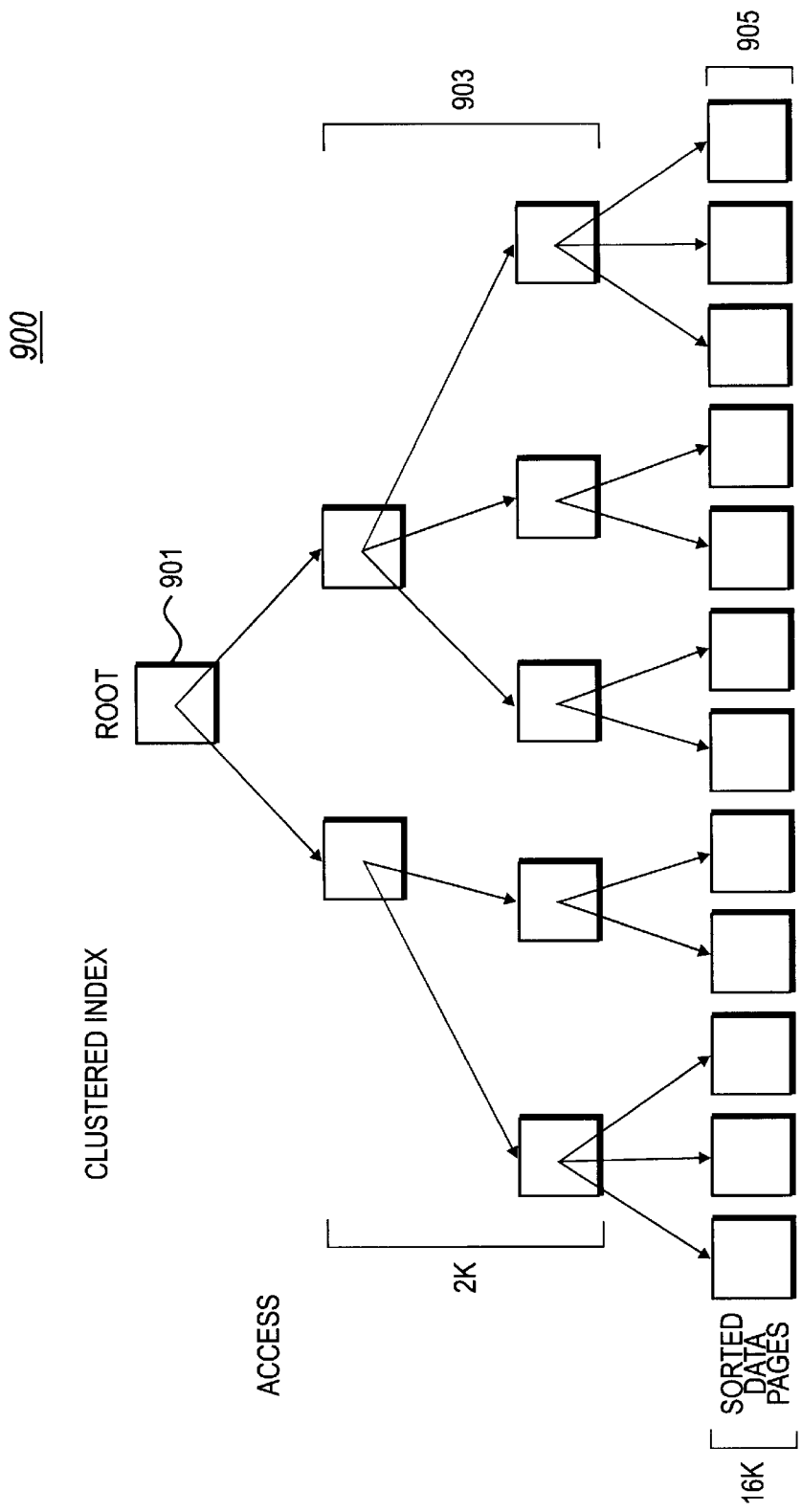
FIG. 9 is a block diagram illustrating a clustered-index access approach for retrieving information.

A second approach available to the Optimizer is clustered-index access. Consider, for instance, clustered index 900 illustrated in FIG. 9. Here, the index comprises a root node 901, intermediate nodes 903, and terminal or leaf nodes 905. Since the index is "clustered," the data pages for the table are stored on the leaf nodes 905 (so that the data pages themselves are sorted by the clustered index key). For clustered index access, the Optimizer adopts the following strategy. When navigating among non-leaf nodes, the Optimizer does not adopt large I/O technique; instead, standard access is employed, such as using 2K I/O block access. Once the system has navigated to the first leaf node (i.e., data page), however, it will at that point switch to large I/O technique (e.g., 16K access blocks, or 4K, 6K, 8K, 32K, or 64K block access).

To understand this approach, consider the following example. Suppose a query seeks all employees currently working in the toy department of a store. Such a query would be processed by navigating through the clustered index, traversing intermediate nodes 903, until the system arrived at the first data page storing the sought-after information. To actually satisfy the query, however, the system might need to scan several data pages before it has retrieved all rows of the table satisfying the query. Accordingly, the approach adopted by the Optimizer is to employ 2K block I/O technique while traversing the intermediate nodes (which typically are not contiguously stored). Once at the first data page of interest, however, the system at that point switches to large I/O technique until it has exhausted those rows satisfying the query. In the event that the cache overflows during the scan (e.g., the table is large and the query is general in nature), the Optimizer further adopts a fetch-and-discard strategy.

Figure 10:
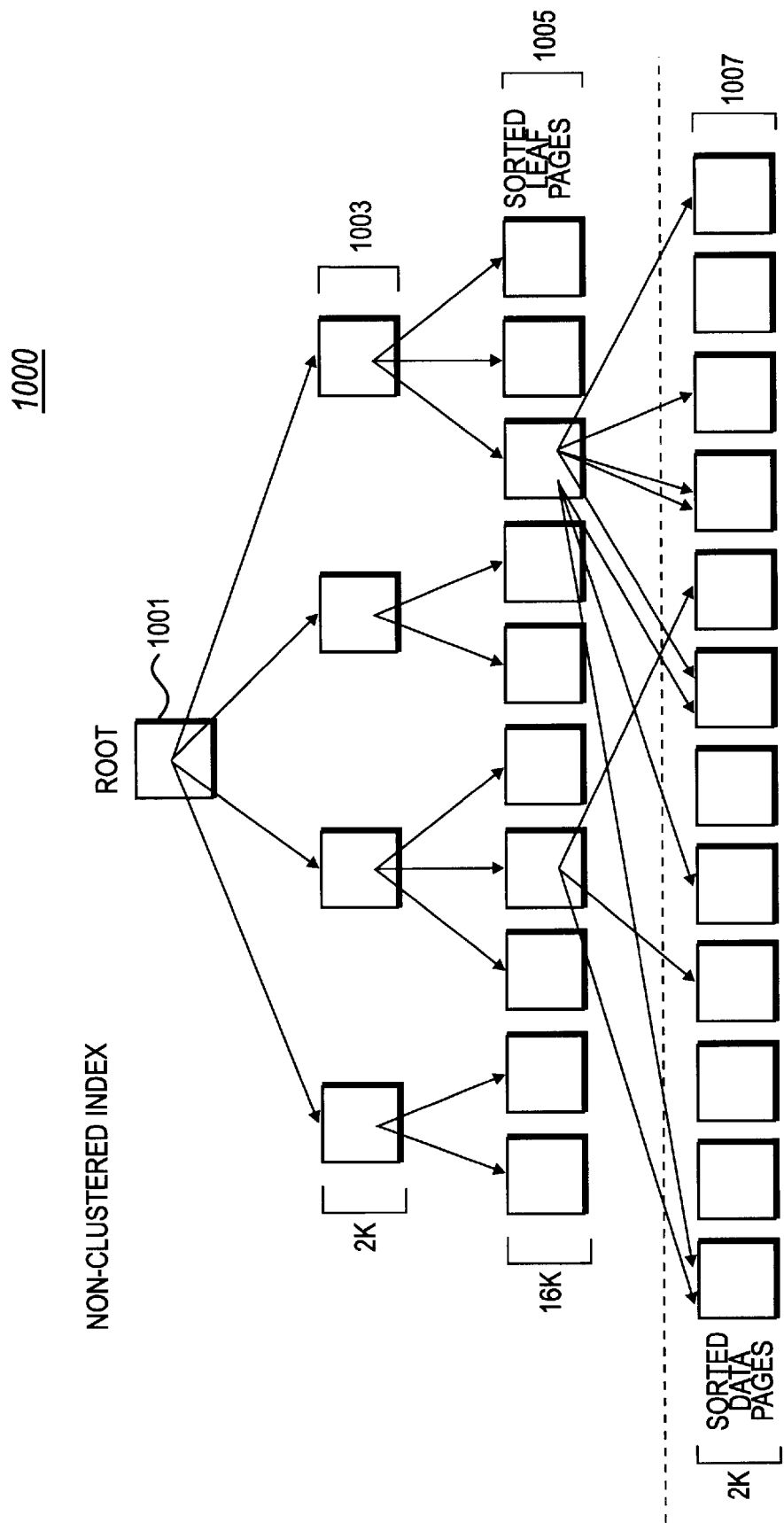
FIG. 10 is a block diagram illustrating a standard (non-clustered) index access approach for retrieving information.

FIG. 10 illustrates the strategy employed for a non-clustered index 1000 (e.g., conventional B-Tree index). When traversing the index, the system employs standard (2K) access technique for the intermediate nodes 1003, as shown. At the level of the leaf nodes 1005, however, the key values stored by the nodes are sorted and, thus, the system can employ large (e.g., 16K) I/O technique. Since the index is non-clustered, the system must still access the individual data pages, shown at 1007. In particular, the data pages are not physically sorted by the index key. Accordingly, the system accesses the data pages (via pointers or references stored at the leaf nodes) using standard (e.g., 2K) access technique.

In a manner similar to a heap scan, scans involving temporary tables (e.g., TEMP.DB) are approached using large I/O technique together with a fetch-and-discard strategy. Here, the Optimizer recognizes that a temporary table is generally used only once and, hence, is a good candidate for the fetch-and-discard strategy.

For each scan method (i.e., heap scan, clustered index, non-clustered index), therefore, the strategy adoped by the Optimizer can be summarized as follows.

Heap scan: Large I/O+MRU

Clustered index: Large I/O on data pages+MRU

Non-clustered index: Large I/O on leaf level pages+No-MRU.

Others: Large I/O+MRU (e.g., temporary tables and text/image)

B. Optimizer decisions are based on logical clustering

The Optimizer makes the foregoing decisions based on logical, not physical, clustering. Pages which are logically together (clustered) are not necessarily physically stored together. In other words, logical clustering does not necessarily physical clustering. Consider, for instance, data which is sorted on an index key, such as a clustered index of the prior example having data pages sorted by department_ID and employee_ID. Although such pages are logically contiguous—one after another—the pages themselves are not necessarily contiguous on the physical storage disk.

In the currently-preferred embodiment, the Optimizer makes the decision that two pages which are ordered logically together are probably stored physically together as well. In those instances where data fragmentation is problematic, however, such an assumption might not hold true. This can be addressed by defragmenting the data (e.g., rebuilding indexes). Alternatively, users can alter this assumption using query overrides, session overrides, or DBA overrides.

C. Access strategies for multi-table queries

The foregoing strategies have focused on simple queries involving a single table. Often, however, a query will involve multiple tables, such as a query which "joins" two or more tables. In such instances, the Optimizer adopts the following approach. Initially, the Optimizer looks at each table of a given query individually, in a manner similar to that described above for a single table query. After analyzing access of each table individually, the Optimizer then considers access strategies when accessing tables in a particular order (i.e., "join order"), and permutations thereof. These decisions are folded into a statistical cost-based model. In particular, the statistical model examines "logical I/O's" and "physical I/O's." A logical I/O operation represents input/output for accessing a page (logical) unit. For instance, if a query requires the system to retrieve four data pages, the cost in terms of logical I/O's is four logical I/O's. If, in fact, each of those four pages is not present in the cache memory, the system will actually incur four physical I/O's (operations) for retrieving the pages. More likely, on the other hand, the first physical I/O action will result in more than one page being brought into cache memory. In such an instance, the ultimate number of physical I/O's required is less than four.

D. Determination of use of MRU replacement strategy

Figure 11:
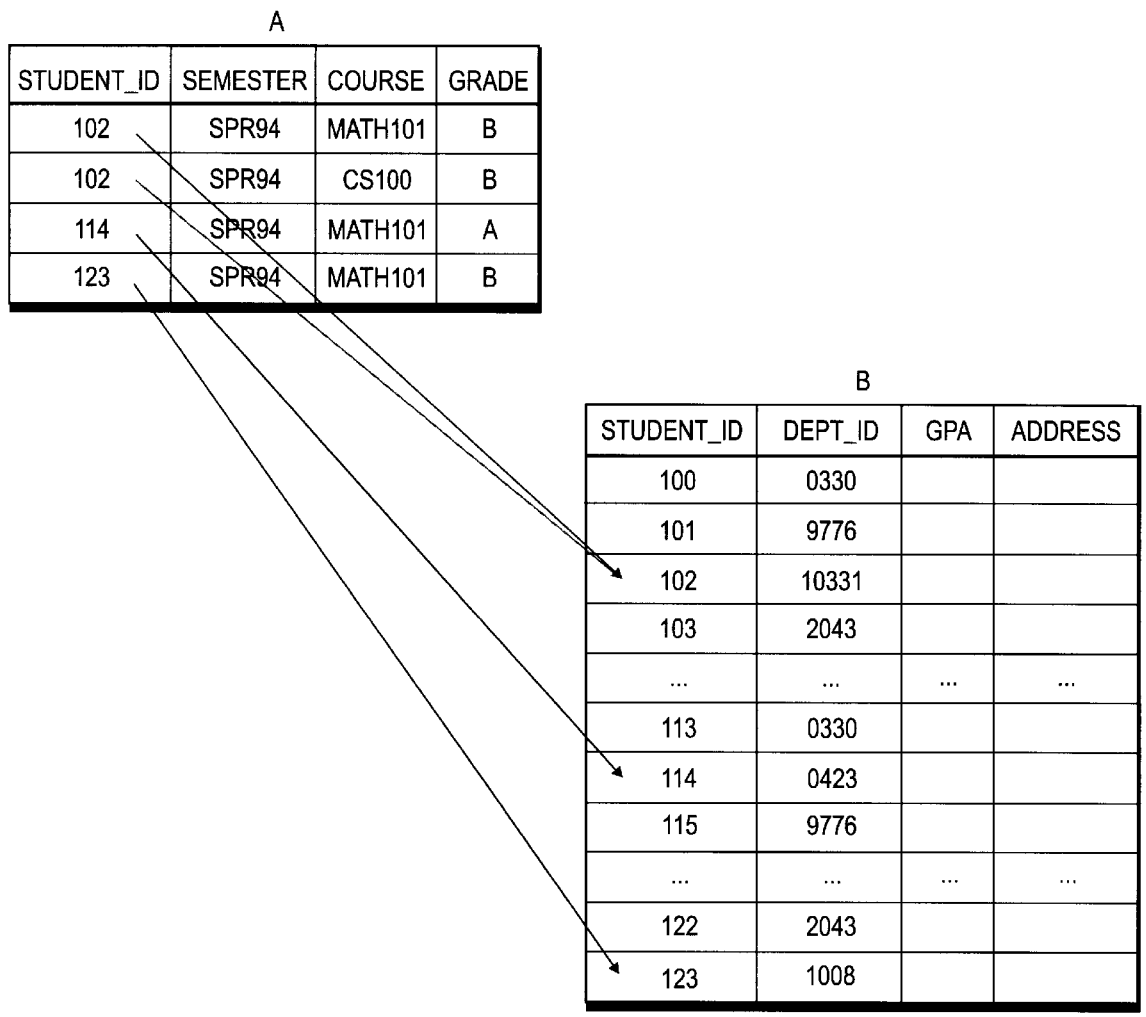
FIG. 11 is a block diagram illustrating use of a most-recently used (MRU) or "fetch and discard" strategy for processing a query involving a join of multiple tables.

Use of a most-recently used (MRU) or "fetch and discard" strategy is perhaps best explained by way of example. Consider a query involving a join of outer table A with inner table B, as illustrated in FIG. 11. Here, the two tables are joined and indexed on the same column (e.g., student_ID). For each record of the outer table, the system determines matching records (if any) of the inner table. The strategy for each table will initially be based on the approach adopted for each table separately (as described above). A join scenario, however, alters this analysis. For instance, the system might have determined earlier to adopt a fetch-and-discard strategy for the inner table (i.e., when applying a single-table analysis). For the join scenario illustrated in FIG. 11, however, such a strategy is sub-optimal. In particular, since the inner table is repeatedly scanned, it should be preferentially retained in the cache, not discarded.

By default, the system adopts a most-recently used (MRU)/fetch-and-discard strategy when a table appears to require 50% (or more) of the cache. The exact threshold is user configurable, however. If a table is an inner table of a join, however, the Optimizer considers a strategy of not discarding pages; more particularly for an inner table, the Optimizer adopts a strategy of not discarding pages if the outer table is not unique. This can be summarized as follows.

MRU/Fetch-and-Discard

1) If a table appears to take 50% of the cache (configurable).

2) For inner table, consider not discarding pages.

Additionally, the Optimizer does not adopt a discard strategy if the join column(s) is not the same as the index key. Consider a scan of an inner table by department_ID, such as the table presented in the prior example. Here, the records with respect to student_ID would arrive in a random order. In such a case, the pages of the inner table read into the cache might be needed at a future time and, thus, should not be discarded. If, on the other hand, the system is using an index on student_ID and joining on student_ID, the system knows that once it looks at a page once it will not look at it again; in such an instance, the system can adopt a fetch-and-discard strategy. When scanning the inner table, if the system determines that it is retrieving records with a high degree of clustering, the system can switch into large I/O access. In this manner, the system can minimize the number of physical I/O's required for the inner table.

For the outer table, the Optimizer always adopts the MRU strategy. This is because the system knows that once it scans the records once, it will not scan them again. For determining whether to employ large I/O transfer, the Optimizer relies on the decision which it made for the table individually.

For these query scenarios, therefore, the strategy adoped by the Optimizer can be summarized as follows.
Inner table:
   MRU/ F&D
   1) Do not discard if outer is not unique.
   2) Join column not the same as index key.
   Large I/O
   1) Large I/O for inner table if accessing very "clustered" records.
Outer table:
   1) MRU.
   2) Large I/O: use single table strategy.
   Originally appended hereto as Appendix A was:
   Cache Strategy Optimization, High Level Design (BMOpt_design_doc.fm), Version 1.3 ©1995 Sybase, Inc.
This document has been canceled for convenience of patent publication, and its disclosure is hereby incorporated by reference for providing further description of the present invention.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a system comprising a database for storing and retrieving information from database tables, each database table comprising a plurality of data pages for storing data records, a method for retrieving information from database tables in response to a database query, the method comprising:
   receiving a query specifying retrieval of specific information of interest from a database table, said database table having a clustered index which stores data pages at its terminal nodes; and
   retrieving the specific information of interest using a first input/output (I/O) block size and a second I/O block size for retrieving information by:
      (i) navigating the clustered index for locating a storage location where said particular information of interest is stored using said first I/O block size to retrieve non-terminal nodes as the clustered index is traversed, and
      (ii) after navigating to the storage location where said specific information of interest is stored, retrieving data pages storing said specific information of interest using said second I/O block size.

2. The method of claim 1, wherein said first I/O block size is smaller in size than said second block size.

3. The method of claim 1, wherein said first I/O block size is substantially equal to a 2K block size.

4. The method of claim 1, wherein said second I/O block size is substantially equal to a 16K block size.

5. The method of claim 1, wherein said second I/O block size is larger in size than each data page, such that substep (ii) retrieves a plurality of contiguous data pages with each I/O block retrieved.

6. The method of claim 1, wherein said first I/O block size is equal in size to each non-terminal node of the clustered index.

7. The method of claim 1, wherein each data page has a size substantially equal to a 2K block, and wherein said second I/O block size is substantially equal to a block size which is a multiple of a 2K block.

8. The method of claim 7, wherein said second I/O block size is substantially equal to a selected one of a 4K, 6K, 8K, 16K, 32K, and 64K block.

9. The method of claim 1, further comprising:
   repeating substep (ii) multiple times until all data pages storing said specific information of interest have been retrieved.

10. The method of claim 1, wherein said non-terminal nodes each store a reference pointing to another non-terminal node or pointing to a terminal node which stores a data page having information of interest.

11. In a database system comprising a database for storing and retrieving information from database tables, a method for retrieving information from database tables in response to a database query, the method comprising:
   receiving a query specifying retrieval of specific information of interest from a database table, said database having an index including terminal nodes each of which points to a particular data page;
   retrieving the specific information of interest using a first input/output (I/O) block size and a second I/O block size for retrieving information by:
      (i) navigating the index for locating a terminal node which points to a storage location where said information of interest is stored using said first I/O block size to retrieve each node of the index traversed, and
      (ii) after locating a storage location where said specific information of interest is stored, retrieving data pages storing said specific information of interest using said second I/O block size.

12. The method of claim 11, wherein said first I/O block size is smaller in size than said second block size.

13. The method of claim 11, wherein said first I/O block size is substantially equal to a 2K block size.

14. The method of claim 11, wherein said second I/O block size is substantially equal to a 16K block size.

15. The method of claim 11, wherein said second I/O block size is larger in size than each data page, such that substep (ii) retrieves a plurality of contiguous data pages with each I/O block retrieve.

16. The method of claim 11, wherein said first I/O block size is equal in size to each node of the index.

17. The method of claim 11, wherein each data page has a size substantially equal to a 2K block, and wherein said second I/O block size is substantially equal to a block size which is a multiple of a 2K block.

18. The method of claim 17, wherein said second I/O block size is substantially equal to a selected one of a 4K, 6K, 8K, 16K, 32K, and 64K block.

19. The method of claim 11, further comprising:
repeating substep (ii) multiple times until all data pages storing said specific information of interest have been retrieved.

20. The method of claim 11, wherein said index comprises a non-clustered index.

21. In a database system comprising a database for storing and retrieving information from database tables, each database table comprising a plurality of data pages for storing data records, a method for retrieving information from database tables in response to a database query, the method comprising:
receiving a query specifying retrieval of specific information of interest by joining first and second database tables;
determining a join order by assigning one of the tables to serve as an outer join table and the other table to serve as an inner join table, such that the system will scan the inner join table for each record of the outer table, for locating said specific information of interest; and
retrieving the specific information of interest by using a fetch and discard strategy on the outer join table, such that most-recently used data pages of the outer join table fetched are preferentially discarded from memory.

22. The method of claim 21, wherein data pages of the inner join table are preferentially kept in memory.

23. The method of claim 21, further comprising:
As each table is scanned, retrieving data pages by using an input/output (I/O) block size which is larger than the size of each data page.

24. The method of claim 23, wherein said I/O block size is equal to a size which is a multiple of a 2K block.

25. The method of claim 21, wherein joining first and second database tables includes joining the two tables on one or more columns common to both tables.

* * * * *